United States Patent
Hong et al.

(10) Patent No.: US 10,218,459 B2
(45) Date of Patent: *Feb. 26, 2019

(54) APPARATUS AND METHODS FOR SYMBOL TIMING ERROR DETECTION, TRACKING AND CORRECTION

(71) Applicant: Maxlinear, Inc., Carlsbad, CA (US)

(72) Inventors: Seung-Chul Hong, Carlsbad, CA (US); Anand Anandakumar, Carlsbad, CA (US); Curtis Ling, Carlsbad, CA (US)

(73) Assignee: Maxlinear, Inc., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/584,198

(22) Filed: May 2, 2017

(65) Prior Publication Data
US 2017/0237521 A1 Aug. 17, 2017

Related U.S. Application Data

(63) Continuation of application No. 15/208,544, filed on Jul. 12, 2016, now Pat. No. 9,641,377, which is a
(Continued)

(51) Int. Cl.
*H04L 27/28* (2006.01)
*H04L 1/00* (2006.01)
(Continued)

(52) U.S. Cl.
CPC .......... *H04L 1/0023* (2013.01); *H04L 5/0007* (2013.01); *H04L 7/0016* (2013.01);
(Continued)

(58) Field of Classification Search
CPC ............. H04L 27/2662; H04L 27/2663; H04L 27/2665
See application file for complete search history.

(56) References Cited

U.S. PATENT DOCUMENTS 5,726,973 A 3/1998 Isaksson
6,084,932 A 7/2000 Veintimilla
(Continued)

FOREIGN PATENT DOCUMENTS

EP 1178642 2/2002
WO 2008101252 8/2008

OTHER PUBLICATIONS

Minjian Zhoo et al., "Sampling rate conversion and symbol timing for OFDM software receiver", Communications, Circuits and Systems and West Sino Expositions, IEEE 2 002 (Jun. 29, 2002), pp. 114-118, CP010632229, ISBN: 978-0-7803-7547-5 figure 3 section 3. Sampling rate conversion and symbol timing for OFDM sofware receiver.
(Continued)

*Primary Examiner* — Kevin Kim
(74) *Attorney, Agent, or Firm* — McAndrews, Held & Malloy

(57) ABSTRACT

Systems and methods for adjusting timing in a communication system, such as an OFDM system are described. In one implementation an error signal is generated to adjust the timing of a variable rate interpolator so as to adjust FFT timing. The error signal may be based on detection of significant peaks in an estimate of the impulse response of the channel, with the peak locations being tracked over subsequent symbols and the system timing adjusted in response to changes in the peaks.

18 Claims, 14 Drawing Sheets

One Embodiment of Timing Detection and Correction Processing

Related U.S. Application Data continuation of application No. 14/697,569, filed on Apr. 27, 2015, now Pat. No. 9,391,767, which is a continuation of application No. 14/040,830, filed on Sep. 30, 2013, now Pat. No. 9,020,054, which is a continuation of application No. 12/947,667, filed on Nov. 16, 2010, now Pat. No. 8,548,075.

(60) Provisional application No. 61/261,659, filed on Nov. 16, 2009.

(51) Int. Cl.
*H04L 27/26* (2006.01)
*H04L 25/02* (2006.01)
*H04L 7/00* (2006.01)
*H04L 5/00* (2006.01)

(52) U.S. Cl.
CPC ........ *H04L 25/0216* (2013.01); *H04L 27/265* (2013.01); *H04L 27/2665* (2013.01); *H04L 27/2671* (2013.01); *H04L 27/2695* (2013.01)

(56) References Cited

U.S. PATENT DOCUMENTS

| | | | |
|---|---|---|---|
| 6,101,230 A | 8/2000 | Chun et al. | |
| 6,241,401 B1 | 6/2001 | Kazuo et al. | |
| 6,650,617 B1 | 11/2003 | Belotserkovsky et al. | |
| 7,127,019 B2 | 10/2006 | Koslov | |
| 7,277,503 B2 | 10/2007 | Huang et al. | |
| 7,620,120 B2 | 11/2009 | Auranen | |
| 2003/0031120 A1* | 2/2003 | Miyato | H04L 25/03866 370/203 |
| 2006/0233097 A1 | 10/2006 | Vrcelj et al. | |
| 2007/0253497 A1 | 11/2007 | Chen | |
| 2007/0280364 A1 | 12/2007 | Adachi | |
| 2007/0286268 A1 | 12/2007 | Kim et al. | |
| 2010/0284379 A1 | 11/2010 | Bitran | |
| 2010/0322326 A1 | 12/2010 | Arambepola | |

OTHER PUBLICATIONS

PCT Application PCT/US2010/056891 (0001) International Search Report and Written Opinion dated May 26, 2011.

Tsai, et al. "Joint Weighted Least-Squares Estimation of Carrier Frequency offset and Timing Offset for OFDM Systems Over Multipath Fading Channels" IEEE Trans on Vehicular Tech, vol. 54, No. 1, Jan. 2005.

Van De Beck, et al. "On Channel Estimation in OFMD Systems" 56th IEEE Vehicular Technology Conference, Jul. 1995, Chicago, IL, vol. 2, p. 815-819.

Notification Concerning Transmittal of International Preliminary Report on Patentability, in international application No. PCT/US2010/056891, dated May 22, 2012 (9 pages).

* cited by examiner

Typical Communications System
Affected by Multipath Interference

OFDM Communications System Transmit and Receive Sub-Systems

Typical OFDM IFFT Modulator

One Embodiment of OFDM Demodulation with Timing Adjustment

Received Multipath Signals

Processing Window for Multipath Signals

Example Implementations of Initial FFT Timing Determination

One Embodiment of Timing Detection and Correction Processing

Additional Details of An Embodiment of Timing Detection and Correction Processing Example of Peak Determination Example of Peak Tracking
and Updating An Example of Peak
Tracking and Updating
(Multiple peaks case)

Additional Details of One Embodiment
of Fine Timing Adjustment

APPARATUS AND METHODS FOR SYMBOL TIMING ERROR DETECTION, TRACKING AND CORRECTION

RELATED APPLICATIONS

This application is a continuation of application Ser. No. 15/208,544 filed on Jul. 12, 2016, which is a continuation of application Ser. No. 14/697,569 filed on Apr. 27, 2015, now U.S. Pat. No. 9,391,767, which is a continuation of application Ser. No. 14/040,830 filed on Sep. 30, 2013, now U.S. Pat. No. 9,020,054, which in turn is a continuation of U.S. patent application Ser. No. 12/947,667 filed on Nov. 16, 2010, now U.S. Pat. No. 8,548,075, which in turn claims priority to U.S. Provisional Application Ser. No. 61/261,659 filed on Nov. 16, 2009. The entirety of each of the above referenced documents is incorporated herein by reference in its entirety.

FIELD

This disclosure relates generally to communications systems, including orthogonal frequency division multiplexing (OFDM) systems. More particularly, but not exclusively, the disclosure relates to apparatus and methods for determining and tracking received symbol timing in a communication receiver, as well as providing adjustments for controlling symbol detection timing so as to maximize received symbol energy and/or minimize inter-symbol interference (ISI).

BACKGROUND

Orthogonal frequency division multiplexed (OFDM) communications systems have been developed to address problems in high data rate communications systems, such as multipath interference. In an OFDM system, a transmitter module receives an incoming data stream and modulates the data on orthogonal frequency domain sub-carriers. The modulated sub-carriers are then sent as an OFDM symbol to a receiver. In many OFDM systems a cyclic prefix (CP) is added to the OFDM symbol in the transmitter, typically by inserting a repeat of the end of the symbol in a guard interval at the front of the symbol. By dividing the incoming data stream among multiple sub-carriers, the data rate and thus the bandwidth of these individual sub-carriers is decreased relative to the bandwidth of the incoming data stream. The resulting increase in the duration of the data symbols associated with each sub-carrier can decrease the impact of multipath interference and associated inter-symbol interference (ISI).

One implementation advantage of OFDM systems is that Fast Fourier Transforms (FFTs) and Inverse Fast Fourier Transforms (IFFTs) can be used to simplify the demodulation and modulation processes, respectively. At an OFDM transmitter, incoming data signals are first demultiplexed into a plurality "N" of data sub-signals, each having a lower data rate than the incoming data. Each sub-signal is then translated in parallel into corresponding frequency domain symbols in a real or complex signal constellation (with example constellations using modulation such as QPSK or QAM). An IFFT bank can then be used to convert the frequency domain symbols into complex time-domain I and Q signals at a appropriate baseband or IF frequency, which are then combined to generate a transmit symbol. The transmit symbol can then be upconverted and transmitted at a desired transmit frequency.

At the receiver, an inverse process is applied to the incoming signal. In particular, the received time-domain signal may be quadrature mixed to generate I and Q signals, which are typically at baseband. The baseband signals are then sampled and digitized using analog-to-digital converters ("ADCs"). A forward FFT then operates upon a set of samples within a "window" of the composite received signal in order to convert the received signal back to a plurality of N parallel sub-carrier symbol streams, each of which is then converted to a corresponding binary data stream. These streams are then remultiplexed into a serial stream, which is an estimate of the incoming data stream provided to the transmitter.

However, the existence of Doppler and multipath conditions within the communication channel between the transmitter and receiver can impair the integrity of the transmit signal. Although the use of a cyclic prefix can partially mitigate the adverse effects of such degraded channel conditions, these conditions can cause shifting of the optimal location of the window used for FFT sampling. Failure to appropriately position this FFT window can reduce the quality of the signal produced by the receiver.

SUMMARY

The present invention relates generally to communications systems, including orthogonal frequency division multiplexing (OFDM) systems. More particularly, but not exclusively, the invention relates to apparatus and methods for determining and tracking received symbol timing in a communication receiver, as well as providing adjustments for controlling symbol detection timing so as to maximize received symbol energy and/or minimize intersymbol interference. Although the embodiments described herein are illustrated in the context of an OFDM communications system and OFDM receiver, it is noted that embodiments of the invention may also be applied to other types of communications systems in addition to OFDM systems.

In one aspect, the disclosure relates to a method for controlling FFT module timing in a receiver. The method may include, for example, one or more of the stages of setting an initial timing of the FFT module based on an initial FFT timing parameter, determining, based at least in part on a channel impulse response estimate associated with a first received symbol, an FFT timing adjustment parameter, and adjusting the initial FFT timing based at least in part on the FFT timing adjustment parameter so as to provide an adjusted FFT timing.

The initial FFT timing may be adjusted, for example, by providing a resampled FFT input signal based on the received signal. The sample rate of the resampled signal may be set based at least in part on the FFT timing adjustment parameter. The FFT timing adjustment parameter may be an error signal. A variable rate interpolator may be configured to generate the resampled FFT signal at a sample rate that may be based at least in part on the FFT timing adjustment parameter. The FFT timing adjustment parameter may be an error signal.

The stage of determining an FFT timing adjustment parameter may include one or more of the steps of receiving the channel impulse response estimate, determining one or more peaks in the channel impulse response estimate, comparing the one or more peaks to a set of one or more reference values, and generating the FFT timing adjustment parameter based at least in part on said comparing.

The one or more reference values may be generated by a process that may include one or more stages of setting a threshold value, determining one or more pairs of threshold crossing points, generating the one or more peaks based on the one or more pairs of threshold crossing points, and storing the one or more peaks as the reference values.

The stage of determining one or more peaks may include one or more of the stages of receiving the channel impulse response estimate, determining one or more sets of threshold crossing points, and generating the one or more peaks based on the one or more sets of threshold crossing points. The ones of said one or more peaks may be generated as the average of corresponding ones of the threshold crossing points of the one or more sets of threshold crossing points.

The stage of generating the FFT timing adjustment parameter based at least in part on said comparing may include one or both of determining a subset of peaks within said one or more peaks, said subset consisting of peaks within a distance WIN of ones of the reference points, and generating the FFT timing adjustment parameter as a function of the differences between ones of the subset of peaks and corresponding ones of the reference points. The method may further include generating an updated FFT timing adjustment responsive to receipt of a subsequent symbol at the receiver In another aspect, the disclosure relates to a communication apparatus. The communication apparatus may include a processor module configured to perform one or more of the stages of setting an initial timing of an FFT module based on an initial FFT timing parameter, determining, based at least in part on a channel impulse response estimate associated with a first received symbol, an FFT timing adjustment parameter, and adjusting the initial FFT timing based at least in part on the FFT timing adjustment parameter so as to provide an adjusted FFT timing.

The communications apparatus may include one or more of a means to set an initial timing of an FFT module based on an initial FFT timing parameter, a means to determine, based at least in part on a channel impulse response estimate associated with a first received symbol, an FFT timing adjustment parameter, and a means to adjust the initial FFT timing based at least in part on the FFT timing adjustment parameter so as to provide an adjusted FFT timing.

In another aspect, the disclosure relates to a computer program product. The computer program product may include a computer-readable medium having codes for causing a processor to implement or initiate implementation of one or more of the stages of setting an initial timing of the FFT module based on an initial FFT timing parameter, determining, based at least in part on a channel impulse response estimate associated with a first received symbol, an FFT timing adjustment parameter, and adjusting the initial FFT timing based at least in part on the FFT timing adjustment parameter so as to provide an adjusted FFT timing.

In another aspect, the disclosure relates to an apparatus for controlling FFT timing in a receiver. The apparatus may include one or both of a signal characterization module disposed to generate a channel response estimate based on a first received symbol signal, and a timing control module disposed to generate an FFT timing adjustment parameter based at least in part on the channel response estimate.

The signal characterization module may include one or both of an IFFT module coupled to the output of a demodulator FFT module, and a channel impulse response estimator module coupled to an output of the IFFT module. The channel impulse response estimator may be configured to generate the channel impulse response estimate based at least in part on the output of the IFFT module. The timing control module may include one or both of a variable rate interpolator, and a fine symbol timing module disposed to generate, based at least in part on the channel impulse response estimate, the FFT timing adjustment signal as an error signal. The error signal may be generated so as to adjust the sample rate of the variable rate interpolator responsive to the channel impulse response estimate.

The apparatus may further include an FFT module. The FFT module may be configured to receive an output of the variable rate interpolator, and generate an output signal approximating a transmitted symbol corresponding to the received symbol.

The fine symbol timing module may include one or more of an absolute value module configured to generate an absolute value signal based on the channel impulse response estimate, a peak locator module configured to detect one or more peak values in the absolute value signal, and an error calculation module configured to generate the FFT timing adjustment signal.

The signal characterization module may further include a clock error module disposed to generate a clock error signal. The timing control module may include one or both of a combiner module and a variable rate interpolator module. The combiner module may be configured to combine the FFT timing adjustment signal and the clock error signal so as to generate, as an output, a combined error signal. The output may be coupled to an input of the variable rate interpolator.

In another aspect, the disclosure relates to a method for adjusting a variable rate interpolator in an OFDM receiver. The method may include one or more of generating a channel impulse response estimate for a received OFDM signal, determining the location of one or more peak values in the channel impulse response estimate, generating a timing error signal based at least in part on the one or more peak values, and adjusting the variable rate interpolator responsive to the timing error signal.

The estimating the location of one or more peak values in the channel impulse response may include one or more of the stages of selecting a threshold value, determining one or more pairs of threshold crossing locations of the channel impulse response estimate, and generating the location estimates of the one or more peak values based on ones of corresponding one or more pairs of threshold crossing locations. The ones of the location estimates of the one or more peak values may be generated as the average of ones of the corresponding threshold crossing locations.

The generating a timing error adjustment signal may include one or more of the stages of comparing the one or more peaks to a set of one or more reference values, selecting ones of the estimates of the one or more peaks that are within a predefined search distance WIN of corresponding ones of the one or more reference values, and generating the timing error adjustment signal as a function of the difference between the selected ones of the one or more peak values and the corresponding ones of the one or more reference position values. The function of the difference between the selected ones of the one or more peak values and the corresponding one of the one or more reference position may be the sum of the differences. The generating the channel response estimate for the OFDM signal may be based on a pilot tone included in the OFDM signal.

In another aspect, the disclosure relates to a communication apparatus. The communication apparatus may include a processor module configured to implement or initiate implementation of one or more of the stages of generating a channel impulse response estimate for a received OFDM signal, determining a location of one or more peak values in the channel impulse response estimate, generating a timing error signal based at least in part on the one or more peak values, and adjusting the variable rate interpolator responsive to the timing error signal.

In another aspect, the disclosure relates to a communication apparatus. The communication apparatus may include one or more of a means to generate a channel impulse response estimate for a received OFDM signal, a means to determine a location of one or more peak values in the channel impulse response estimate, a means to generate a timing error signal based at least in part on the one or more peak values, and a means to adjust the variable rate interpolator responsive to the timing error signal.

In another aspect, the disclosure relates to a computer program product. The computer program product may include a computer-readable medium having codes for causing a processor to implement or initiate implementation of one or more stages of generating a channel impulse response estimate for a received OFDM signal, determining a location of one or more peak values in the channel impulse response estimate, generating a timing error signal based at least in part on the one or more peak values, and adjusting the variable rate interpolator responsive to the timing error signal.

In another aspect, the disclosure relates to an apparatus for adjusting a variable rate interpolator in an OFDM receiver. The apparatus may include one or both of a channel impulse response estimator circuit disposed to generate a channel impulse response estimate for a received OFDM signal, and a fine symbol timing (FST) circuit disposed to generate an error signal to be used at least in part to adjust the variable rate interpolator, wherein the error signal is generated based on one or more peaks of the channel impulse response estimate.

The channel impulse response estimator may include a circuit to generate the channel impulse response estimate based on a pilot tone provided in an OFDM signal received by the OFDM receiver. The FST circuit may include one or both of a peak locator circuit disposed to estimate the position of one or more peaks in the channel impulse response estimate, and an error determination circuit disposed to determine a position error between the estimate of the one or more peaks and one or more reference values. The apparatus may further include an updating circuit configured to update and store the peak reference values, and provide the updated peak reference values to the error determination circuit.

The peak locator circuit may be configured to estimate the location of the one or more peaks in the channel impulse response estimate by one or more of the stages of selecting a threshold value, determining one or more pairs of threshold crossing locations of the channel impulse response estimate, and generating the peak location estimates of the one or more peak values based on corresponding one or more pairs of threshold crossing locations. The ones of the peak location estimates of the one or more peak values may be generated as the average of ones of the corresponding threshold crossing locations.

The error signal may be generated by one or more stages of comparing the one or more peaks to a set of one or more reference position values, selecting ones of the estimates of the one or more peaks that are within a search distance of corresponding ones of the one or more reference position values, and generating the error signal as a function of the difference between the selected ones of the one or more peak values and the one or more reference values. The function of the difference between the selected ones of the one or more peak values and the one or more reference values may be the sum of the differences.

Additional aspects of the present invention are further described below in conjunction with the appended Drawings.

BRIEF DESCRIPTION OF THE DRAWINGS

The present invention is more fully appreciated in connection with the following detailed description taken in conjunction with the accompanying drawings, wherein.

DETAILED DESCRIPTION OF EMBODIMENTS

Overview

The present invention is directed generally to apparatus and methods for received signal timing detection, tracking, and error correction. Typical embodiments of the invention may be used in orthogonal frequency division multiplexing (OFDM) communications systems; however, embodiments of the present invention may also be used in other communications systems consistent with the features and functionality described herein.

For example, various embodiments of the invention may be used to determine and track an optimal FFT sampling window for demodulating a received OFDM signal and corresponding OFDM symbols that propagate through a time-varying channel based on controlling FFT timing. The position of optimal symbol sample timing may be determined based on the received OFDM signal, which may be subject to Doppler and multipath distortion and therefore may include frequency shifts and multiple reflected signals. Once the position of optimal sample timing has been determined, the sampled OFDM signal may then be demodulated and the transmitted symbol detected.

As described herein, in an exemplary embodiment, optimal sample timing may be done by adjusting the sampling rate of received signal samples provided to an FFT block in an OFDM receiver. However, FFT timing (or other demodulation processing mechanisms) may alternately be adjusted by providing a timing or triggering signal to the FFT or other demodulation blocks in some embodiments, and other timing adjustments based on the signal processing mechanisms described herein may also be used in some implementations.

In addition to determining optimal FFT timing, FFT timing or window positioning may be tracked over time to accommodate movement of the receiver and/or multipath reflectors as well as addition or removal of multipath reflectors from the signal path.

Figure 1:
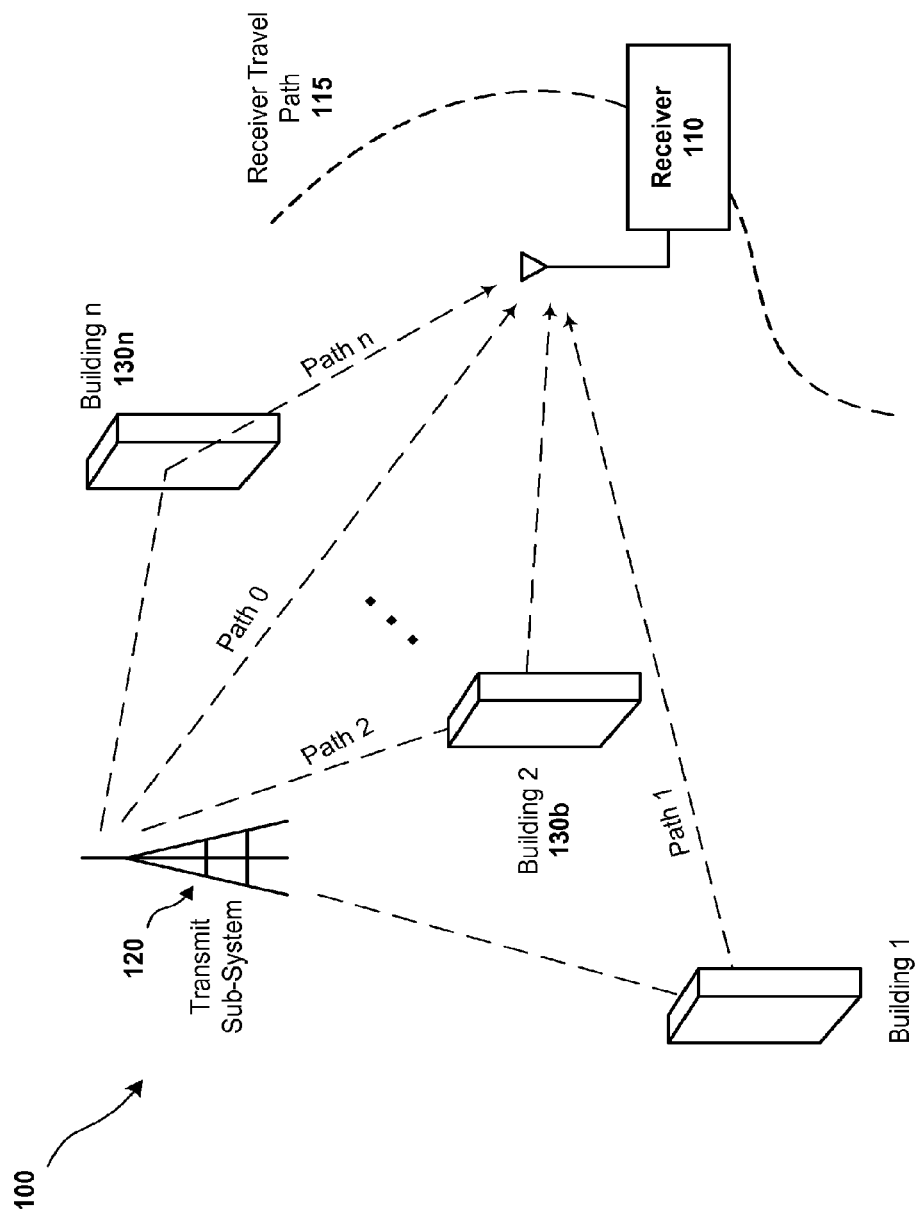
FIG. 1 illustrates a typical OFDM communications system subject to multipath interference.

Attention is now directed to FIG. 1, which illustrates an example communication system 100 subject to multipath interference on which embodiments of the present invention may be implemented. System 100 includes a transmitter 120 and receiver 110, as well as one or more multipath reflectors 130a-n. Reflectors 130 are shown in FIG. 1 as buildings; however, many other types of structures or objects may likewise constitute multipath reflectors in various communications systems on which embodiments of the present invention may be implemented. These may include, for example, building walls, metallic or other reflective structures, vehicles, or other types of electromagnetically reflective objects or structures.

Receiver 110 may be in a fixed position relative to the reflectors 130a-n, or may move along a path 115 relative to the reflectors, as shown in FIG. 1. In addition, the reflectors 130a-n may also move (not shown) and/or reflectors may be added to, or removed from, system 100.

Figure 3A:
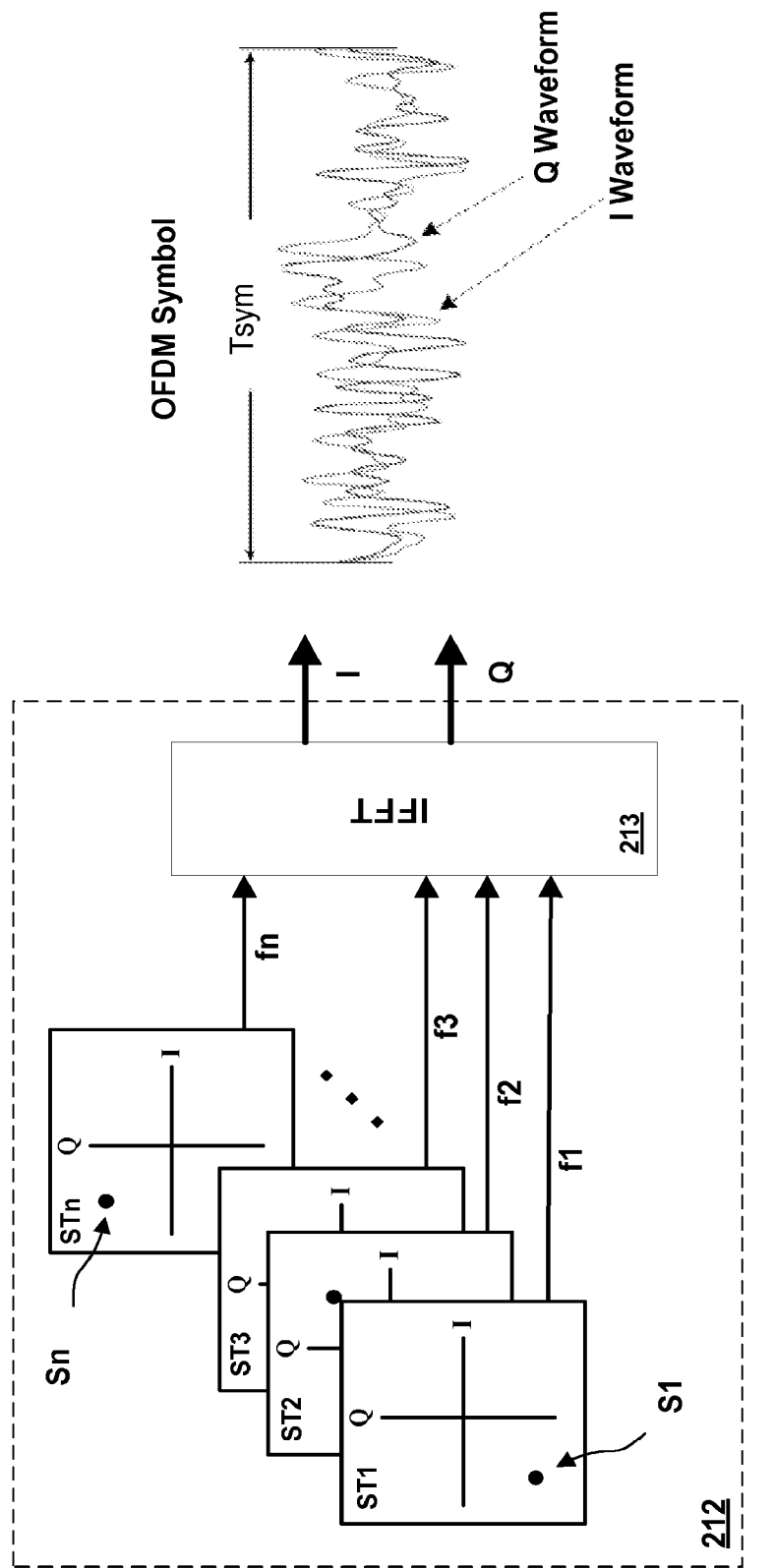
FIG. 3A illustrates an OFDM modulation architecture.

In system 100, the transmit signal provided by transmitter 120 typically propagate along multiple paths to receiver 110. FIG. 1 shows a direct signal path, labeled as Path 0, along with n reflected paths (Paths 1, 2, ... n). Signals transmitted along the various paths may be time shifted relative to each other based on their different path lengths, as well as attenuated and/or frequency (Doppler) shifted. Consequently, the signal received at receiver 110 may include two or more superimposed signals from the various paths. Example signals are shown in FIG. 3A and further described subsequently herein.

As noted previously, an advantage of OFDM systems is their ability to tolerate multipath signals such as those from the multiple signal paths shown in FIG. 1. Because the incoming data signal is divided into multiple sub-channels, the relatively low symbol rate used in the sub-channels allows for adding a guard interval between symbols, making it possible to compensate for time-spreading and intersymbol interference (ISI). In many OFDM systems, a symbol is transmitted along with a cyclic prefix (CP) as part of the guard interval, which allows the receiver to better tolerate multipath and hence ISI. The CP typically consists of a replicated portion of the end of the symbol appended to the beginning of the symbol, which enables the receiver to integrate the received signal over an integer number of sinusoidal cycles. FIG. 3A illustrates an example of combined received symbols and associated CPs for the various signal paths as shown in FIG. 1.

One implementation advantage of OFDM systems in the ability to efficiently modulate and demodulate an OFDM signal using inverse Fast Fourier Transforms (IFFTs) and Fast Fourier Transforms (FFTs), respectively. This avoids the need for tuned sub-channel receiver filters and associated circuitry as are commonly used in convention FDM systems. At the receiver, an FFT module is used to demodulate the received signal, providing potential advantages from the low cost and wide availability of FFT processing hardware and software. However, timing of the FFT processing in the receiver is important to receiver performance. In the presence of multipath, there is typically an optimal timing window or position that maximizes received signal energy and which can be set by adjusting the FFT timing. The optimal FFT location, or "window," may shift forward or backward due to a variety of factors including differences in sample timing between transmitter and receiver as well as changes in the channel through which the transmitted signal is sent.

For example, if the clock reference of the receiver is offset from that of the transmitter, the position of the received symbols in sample space will slip forward or backward, all other factors being equal. If the receiver 110 moves along path 115, the received signals from Paths 0 through N may shift, attenuate, split into multiple paths and/or other new paths may emerge as the wireless channel changes. Consequently, one potential advantage of the present invention is to allow a receiver to track optimal FFT timing regardless of changes in the wireless channel. In an exemplary embodiment, this may be done by adjusting the clocking or sample rate of the received signals by resampling them to an adjusted sample rate. However, in other embodiments, similar or equivalent adjustments, such as providing an FFT trigger signal or other FFT timing adjustment mechanism may also be used.

Figure 2:
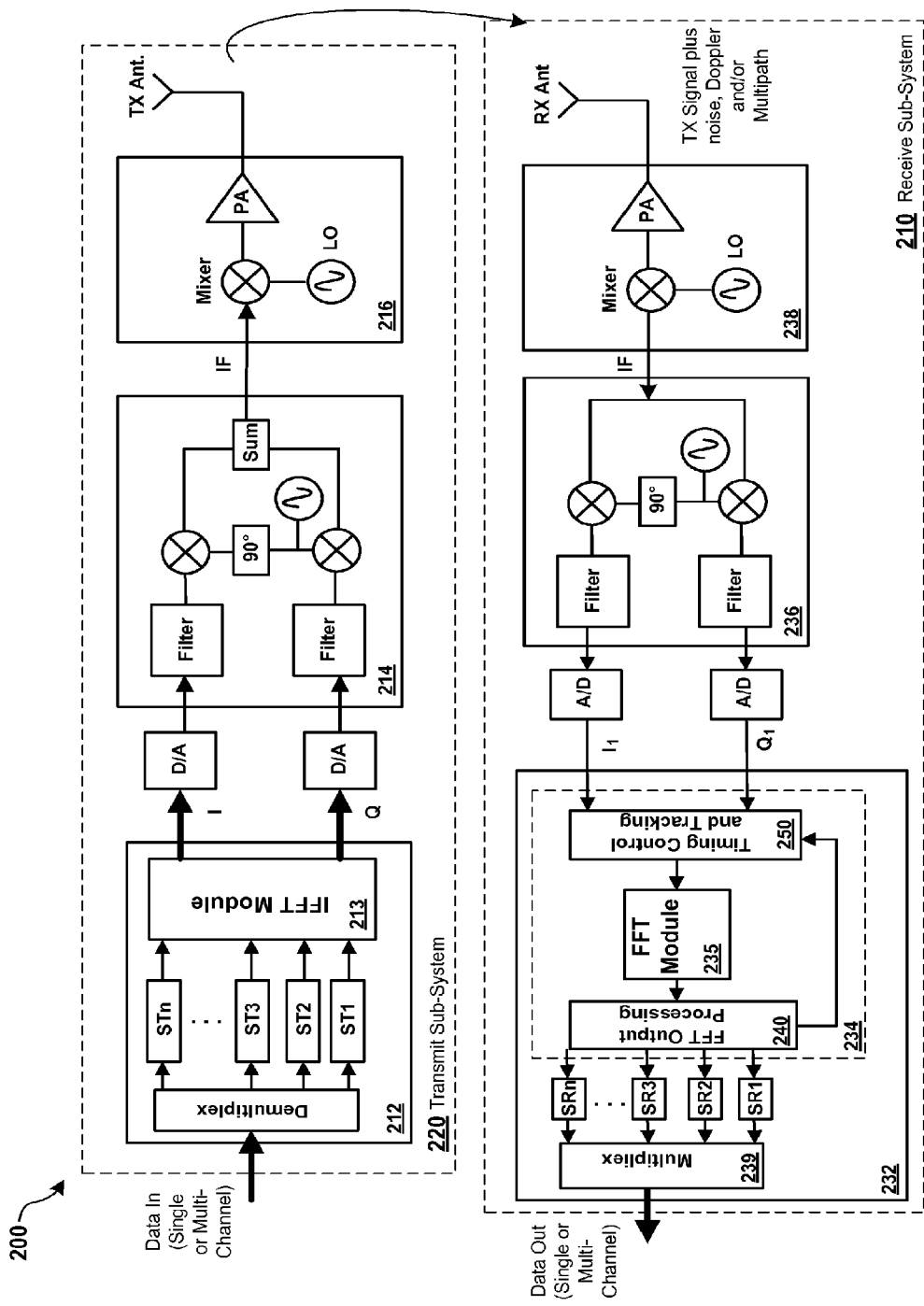
FIG. 2 illustrates an embodiment of an OFDM communications system consistent with the present invention.

Attention is now directed to FIG. 2, which illustrates a high level view of a typical OFDM communications system 200 on which embodiments of the present invention may be implemented. Communications system 200 includes a transmit sub-section 220, which may correspond with transmitter 120 as shown in FIG. 1, and a receive sub-system 210, which may correspond with receiver 110 of FIG. 1. Transmit sub-system 220 includes a modulation module 212 configured to receive either a single data channel or multiple data channels. The sub-system 220 demultiplexes (in the case of a single incoming channel) the digital data into multiple transmit sub-channel signals ST1-STn, or, in the case of multiple input channels, distributes the multiple channels to corresponding transmit sub-channels signals ST1-STn.

An IFFT module 213 then generates I and Q modulated outputs by implementing an IFFT on the transmit sub-channel signals ST1-STn. An implementation of one embodiment of a process effected by the modulation module 212 is described in further detail below and shown in FIG. 3A. The modulated signal may then be upconverted to an intermediate frequency (IF) in mixer module 214, and then further upconverted to a transmit frequency in transmit module 216. A transmitted signal (TX Signal) is sent from a transmit antenna (TX Ant.), where it may then be subject to variable attenuation, noise, Doppler effects, and/or multipath as is shown in FIG. 1, resulting in combined receive signals such as are shown in FIG. 3A.

The receive sub-system 210 receives the transmitted signal, noise, and may also receive one or multipath signals such as those shown in Paths 1-n in FIG. 1. The composite received signal is subject to channel degradation and noise, and may also be affected by Doppler effects or other distortions. Consequently, the received signal must be processed in the receive sub-system 232 to extract an approximation of the transmit signal. In the example OFDM receiver shown in FIG. 2, a downconverter stage 238 may be used in the receiver to convert the received signal to an IF for processing (or, in some implementations the received signal may be directly converted to baseband). A baseband I/Q module 236 then converts the IF signal to baseband I/Q signals, which may then be A/D converted to digital I and Q signals (shown as I1 and Q1 in FIG. 2), which are then provided to demodulation module 232.

Finally, in accordance with aspects of the present invention, demodulation module 232 performs timing adjustment and other processing to the received signal and generates adjusted I and Q signals in module 234 as further described subsequently herein. The adjusted I and Q signals may be processed in an FFT module 235 to extract the various sub-carrier channel signals into demodulated output data signals.

The timing of the FFT module may be controlled in timing detection and processing module 234, which performs timing adjustment based in part on characterization of the received signal as provided as output from the FFT module 235. Output signals are provided from module 234 as signals SR1-SRn. These signals may then be converted to the time domain to replicate the original sub-channel signals. The received sub-channel signals may then be provided as a plurality of digital outputs (if multiple channels were provided as inputs) or re-multiplexed in multiplexer 239 to approximate the original single channel datastream provided to transmit module 212. It is noted that this is a simplified example of an OFDM transmitter and receiver architecture on which embodiments of the present invention may be implemented, and that other circuit elements as are known in the art have been omitted for the purpose of clarity.

Attention is now directed to FIG. 3A which illustrates additional details of one implementation of the modulation module 212. As shown in FIG. 3A, input data is divided into multiple sub-channels, with each of the subchannel symbols mapped to a corresponding point in the selected signal space. For example, in the two-dimensional signal space shown for ST1 in FIG. 3A, a particular signal point S1 within the selected signal constellation is transformed at frequency f1 in the IFFT module into I and Q data. All of the corresponding sub-channels ST2-STn are simultaneously transformed at frequencies f2-fn in the IFFT module and combined so as to generate the OFDM symbol having a symbol duration Tsym. This OFDM signal may then be upconverted to the transmit frequency and sent to a corresponding receiver.

Figure 3B:
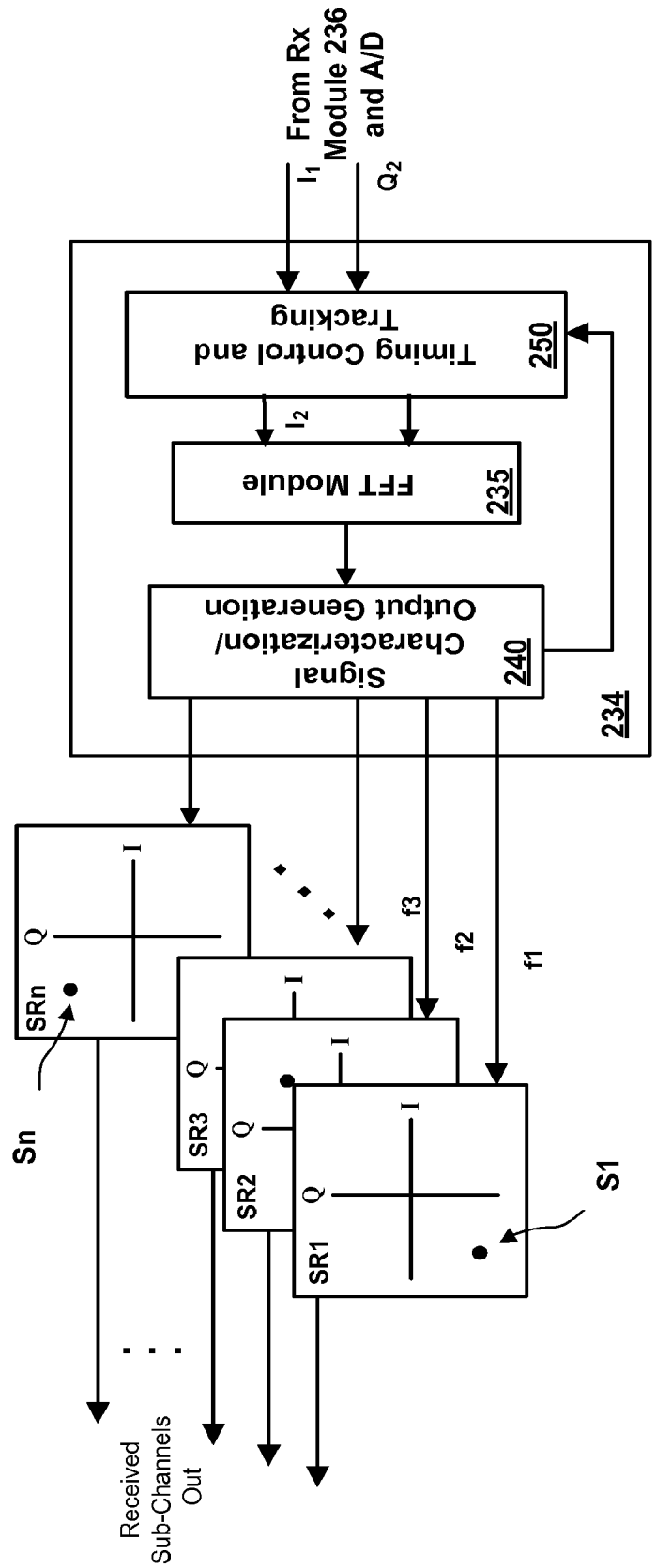
FIG. 3B illustrates an OFDM receiver demodulation architecture in accordance with aspects of the present invention.

An example of an embodiment of a corresponding demodulation module 232 in accordance with aspects of the present invention is shown in FIG. 3B. Module 232 includes a demodulation subsystem 234 which may include an FFT subsystem 235 configured to regenerate the subchannels as SR1-SRn using an FFT and inverse process to that shown in FIG. 3A. In addition, module 234 may include a signal characterization module 240, which is configured to determine signal characteristics of the FFT output and/or provide output data as shown in FIG. 3B, as well as a timing control and tracking module 250, which is configured to set and adjust FFT timing and/or store information about the FFT timing parameters so as to track and adjust FFT timing over time. As noted previously, since the received signal may include noise and multipath signals and/or other distortion, timing of the FFT is typically important to receiver performance.

Figure 4A:
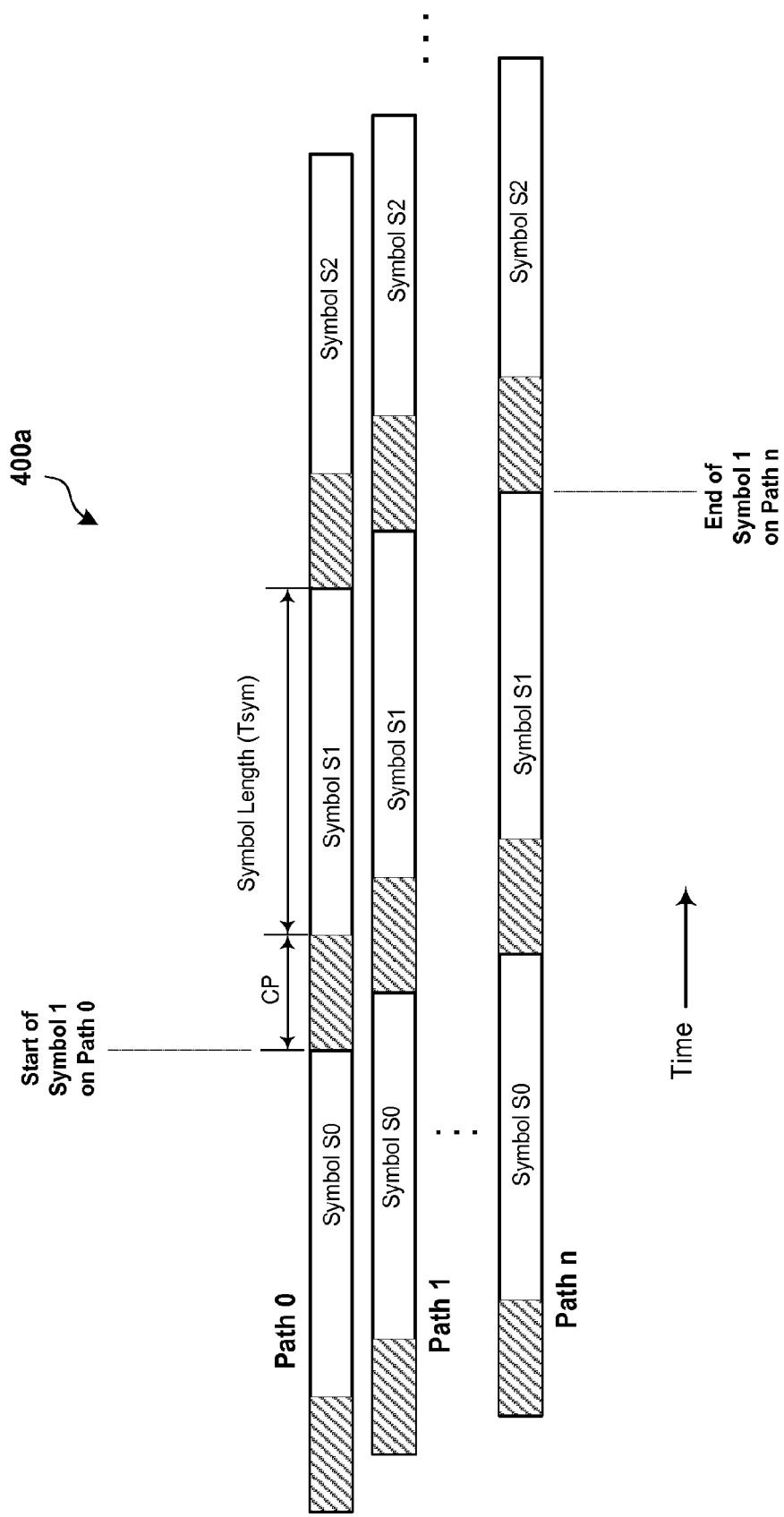
FIG. 4A illustrates an example of multipath signal reception in an OFDM receiver system.

This problem is further illustrated in FIG. 4A, which shows an example direct signal (on Path 0 as shown in FIG. 1), combined with additional multipath signals on Paths 1-n. At the receiver module 232, the various signals shown in FIG. 4A are effectively added in the received signal to comprise a combined or composite signal with overlapping symbols from the various paths. Determination of FFT timing, in view of the combined signal characteristics, becomes an important concern to optimize receiver performance.

Referring further to FIG. 4A, transmitted symbols S0, S1 and S2 are shown, with a CP appended in a guard band at the beginning of each symbol. The effect of multipath is to superimpose multipath signals from Paths 1-n onto the direct signal received from Path 1, which affects the optimal timing for performing the FFTs in subsystem 235. Consequently, there is an optimal time window in which to perform the FFT operation on the received symbols, as further described below.

Figure 4B:
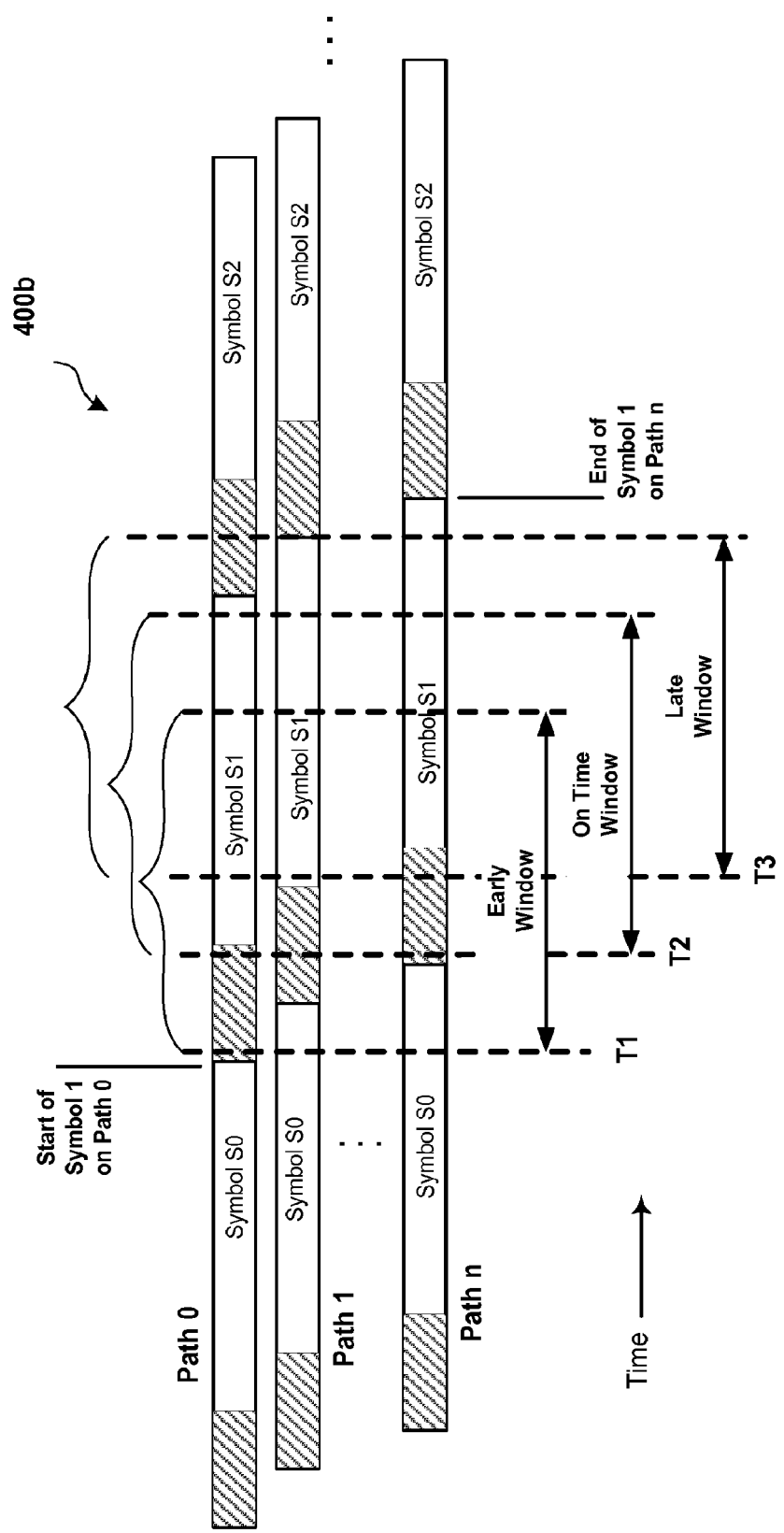
FIG. 4B illustrates examples of timing of FFT sampling for the signals shown in FIG. 4A.

Attention is now directed to FIG. 4B, which illustrates various possible timing windows for performing the FFT, as well as an optimal timing window in accordance with aspects of the present invention. As shown in FIG. 4B, the window duration for performing the FFT corresponds to the duration of a transmitted symbol, Tsym, and this window can be time shifted relative to the received symbols S0, S1, . . . SN. As a first example, starting the FFT at time T1 as shown in FIG. 4B will result in an early window since initiating the FFT at T1, when symbol S1 begins, will cause the FFT to include energy from multipath signals from the previous Symbol (S0) received from Paths 1-n and will exclude some signal energy from symbol S1 from the multipath signals.

Alternately, starting the FFT processing of symbol S1 at time T3 will result in a late window since this timing will include signal energy from the next symbol, S2 from the direct path, Path 0 and likewise exclude some signal energy from the direct signal. In either scenario, signal energy from adjacent symbols will be included in the FFT processing while energy from the transmitted symbol will be excluded, thereby decreasing symbol detection performance.

Consequently, there is an optimal FFT start time, T2 as shown in FIG. 4B, such that the FFT window includes a minimal amount of energy from adjacent symbols. Alternately, the FFT window may be placed so that it includes the channel peak value with a predetermining timing margin (for example, +/− n,m samples). In this approach, if the channel peak is located on the Pth sample within one OFDM symbol period, the starting position of the FFT window could be set at the P-nth sample. Moreover, as noted previously, this optimal timing window may move over time as the receiver position changes and/or as multipath reflectors are added or removed from the communication channel or are moved relative to the transmitter or receiver (or due to movement of the receiver relative to the transmitter). Accordingly, one potential advantage of the present invention is to allow a receiver to determine and track the optimal timing of the FFT regardless of changes in the wireless channel. This optimal timing may be referred to herein as an optimal FFT timing or optimal FFT timing window.

Figure 5:
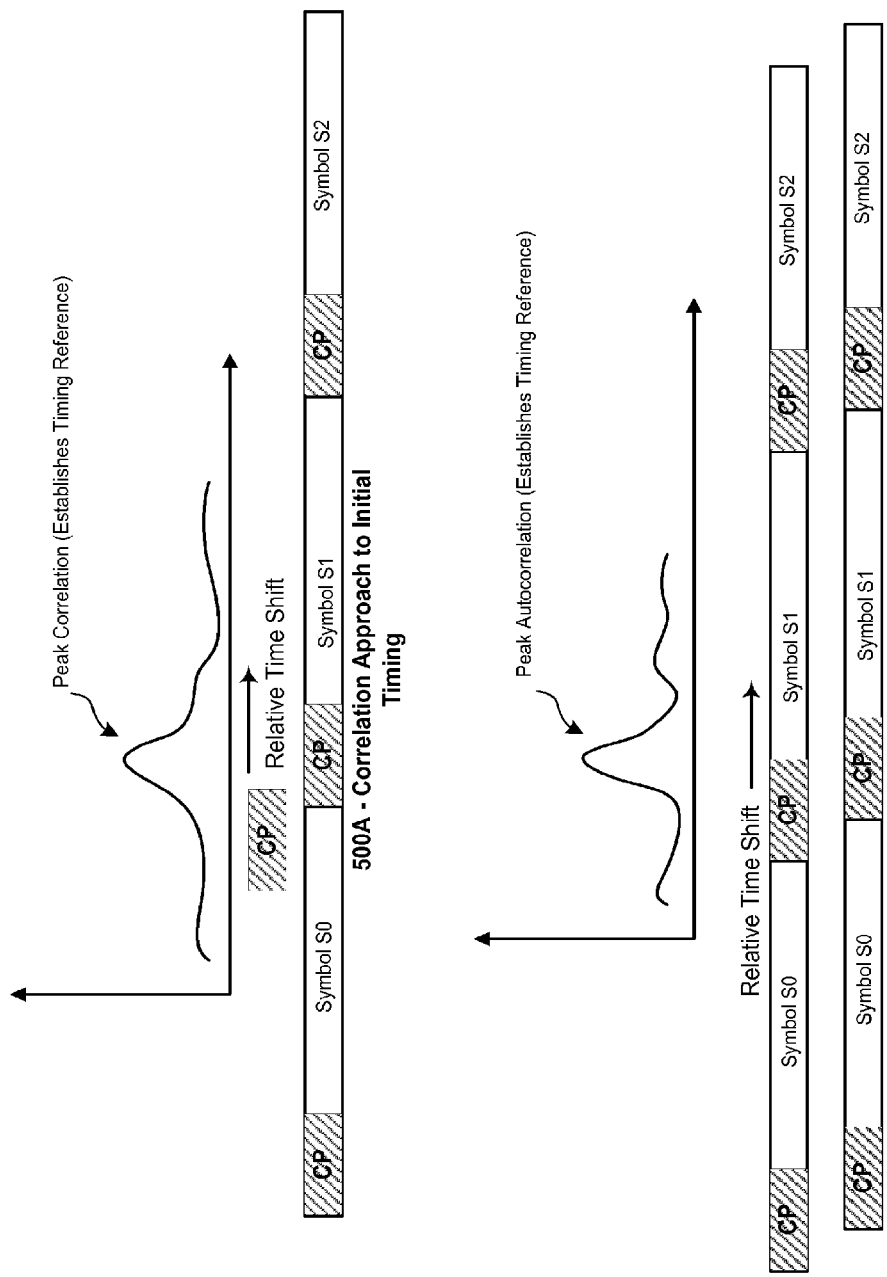
FIG. 5 illustrates embodiments of initial FFT timing determination in an OFDM receiver.

Attention is now directed to FIG. 5, which illustrates details of implementations for determining initial FFT sample window timing based on an initial FFT timing parameter. As shown in FIG. 5, initial FFT window placement may be done by cross-correlation or auto-correlation based methods, as well as by other methods known or developed in the art. For example, In a cross-correlation implementation, the repetitious structure of a signal such as the CP or another signal that is repeated in the time domain (such as is used in WiMax, CMMB) may be used. An example of this approach is shown in 500A, which illustrates shifting a CP relative to the received signal and then determining relative FFT timing based on the peak correlation signal. Once this peak is determined, the FFT timing can be set based on an initial FFT timing parameter, such as a relative offset from the determined peak. This may be done by advancing or retarding FFT timing based on a number of samples corresponding to the relative timing difference between the CP peak and the start of the next symbol.

Similarly, in an auto-correlation based implementation as shown in 500B, a known training signal or training symbols may be used. Initial FFT window positioning may be determined by an initial FFT timing parameter, which may be, for example, an offset distance between the correlation peak position and a predetermined value. Tracking may be done by various methods, but typically initial FFT window timing should be determined in a way so as to include significant peaks. Examples of approaches for initial timing determination are described in, for example, U.S. Pat. Nos. 6,421,401, 6,650,617 as well as United States Patent Publication 2006/0233097, the contents of which are hereby incorporated by reference herein.

Figure 6:
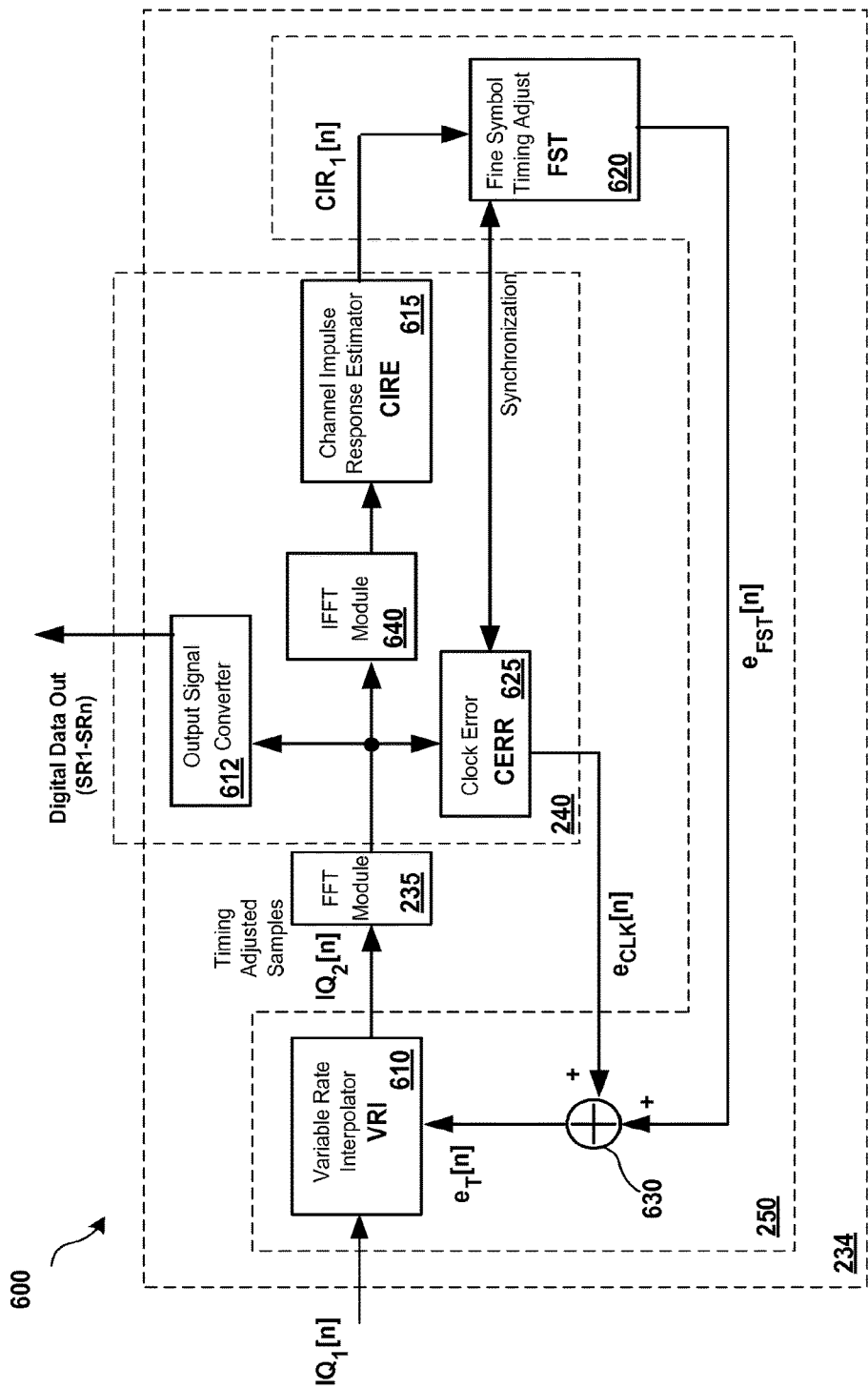
FIG. 6 is a high level illustration of a circuit implementing an embodiment of the present invention for FFT timing adjustment signal generation.

Attention is now directed to FIG. 6, which is a high level illustration of an embodiment of aspects of the present invention. In an exemplary embodiment, FFT timing is adjusted by adjusting the sample rate of the received signal so that the FFT start time can be triggered according to a known or reference sample count. As noted previously, in some embodiments other methods for controlling FFT timing may alternately be used.

Returning to FIG. 6, in an exemplary embodiment a variable rate interpolator 610 may be used to adjust the sample timing in response to an FFT timing adjustment parameter, which in the illustrated example is an error or control signal provided to the interpolator. By adjusting the sample timing, the FFT timing is correspondingly adjusted, assuming the FFT is configured to operate periodically based on the number of received samples. At a high level, the embodiment of FIG. 6 includes the FFT module 235 as well as exemplary components of modules 240 and 250 as shown in FIG. 2. Module 240 is configured to receive the FFT outputs and provide output data signals as well as signals characterizing the received OFDM signal and associated channel. Module 250 is configured to adjust the FFT timing in response to the output of module 240.

More specifically, baseband I and Q signal samples (IQ1 [n], corresponding to I1 and Q1 as shown in FIG. 2) from a received OFDM signal may be provided from a communication receiver module (for example, module 236 and A/D converters as shown in FIG. 2A) to variable rate interpolator (VRI) 610. Composite error signal eT[n] is provided to VRI 610 to correct sample timing, which will corresponding adjust the FFT timing in FFT module 235.

VRI 610 provides, as an output, adjusted I and Q samples signal IQ2[n]m which are set at a sample rate determined by VRI 610 in response to input error signal eT[n]. The output sample rate may be set to a higher value than the input rate if the polarity of eT[n] is positive, or correspondingly to a lower value if the polarity of eT[n] is negative (alternately, other error signal to sample rate adjustment mappings may be used).

The output of FFT module 235 may then be used to generate the digital output data as shown in FIG. 2. In addition, the output of the FFT module 235 may be further processed so as to generate parameters characterizing the OFDM signal and/or the communications channel. In particular, in an exemplary embodiment, the output of FFT module 235 is provided to an IFFT module 640 which converts the FFT output signal to the time domain for further processing in Channel Impulse Response Estimation Module (CIRE) 615. The output of the FFT module may also be provided to a Clock Error Determination Module (CERR) 625.

CERR 625 and CIRE 620 estimate the clock error and channel impulse response, based on IQ2[n], respectively. This may be done by for example, using techniques such as are described in Pei-Yun Tsai, Hsin-Yu Kang and Tzi-Dar Chiueh, "Joint Weighted Least-Squares Estimation of Carrier-Frequency Offset and Timing Offset for OFDM Systems Over Multipath Fading Channels", IEEE Trans. On Vehicular Tech. Vol. 54, No 1, January 2005 for CERR determination, and Van de Beek, J.-J., Edfors, O. S., Sandell, M., Wilson, S. K., and Börjesson, O. P., "On channel estimation in OFDM systems," 45th IEEE Vehicular Technology Conference, Chicago, Ill., vol. 2, pp. 815-819, July 1995 for CIRE determination, or using other techniques as are known or developed in the art.

For example, CERR 625 may convert IQ2[n] to the frequency domain to extract the clock error, as is commonly done in OFDM systems; while CIRE may use pilot symbols or pilot tones as are commonly provided in OFDM systems to estimate the channel impulse response. Other channel impulse response estimation methods and apparatus as are known or developed in the art may also be used.

The output of CIRE 620, which includes data representing the estimated channel impulse response, may then be sent to Fine Symbol Timing (FST) Module 620 which further estimates the symbol timing error for higher-resolution correction of the sampling error in IQ2 and generates an FFT timing adjustment parameter to adjust the FFT timing. Additional details of an embodiment of FST 620 are shown in FIG. 7 and described below.

In addition, as shown in FIG. 6, the error signals provided by CERR 625 and FST 620 may be selectively combined in combiner module 630 so as to provide a composite error correction signal eT[n] to VRI 610 to compensate for both clock error and symbol timing error. In an exemplary embodiment, this may be done as follows. Initially, the FST module 620 or FST module 620 output is disabled and initial FFT timing is set by CERR 625 module. Once determined, this value does not typically change rapidly, and therefore it may be set to a fixed value which may be either maintained for a relatively long duration, updated periodically, or updated asynchronously based on a particular signal or channel condition. In general, the output eCLK[n] from module CERR 625 will be fixed for a long duration relative to the update rate of module FST 620. Accordingly, in an exemplary embodiment, once the output of CERR 625 is initially set, it will be maintained at a fixed value while the error signal eFST[n] from module 620 is repeatedly updated. The two signals are combined in module 630, with the composite error signal eT[n] then provided to VRI 610 to adjust the output sample rate responsive to the error signal. In some embodiments CERR 625 and FST 620 may be communicatively coupled as shown in FIG. 6 to coordinate communication between the modules to adjust their error signals synchronously.

Figure 7:
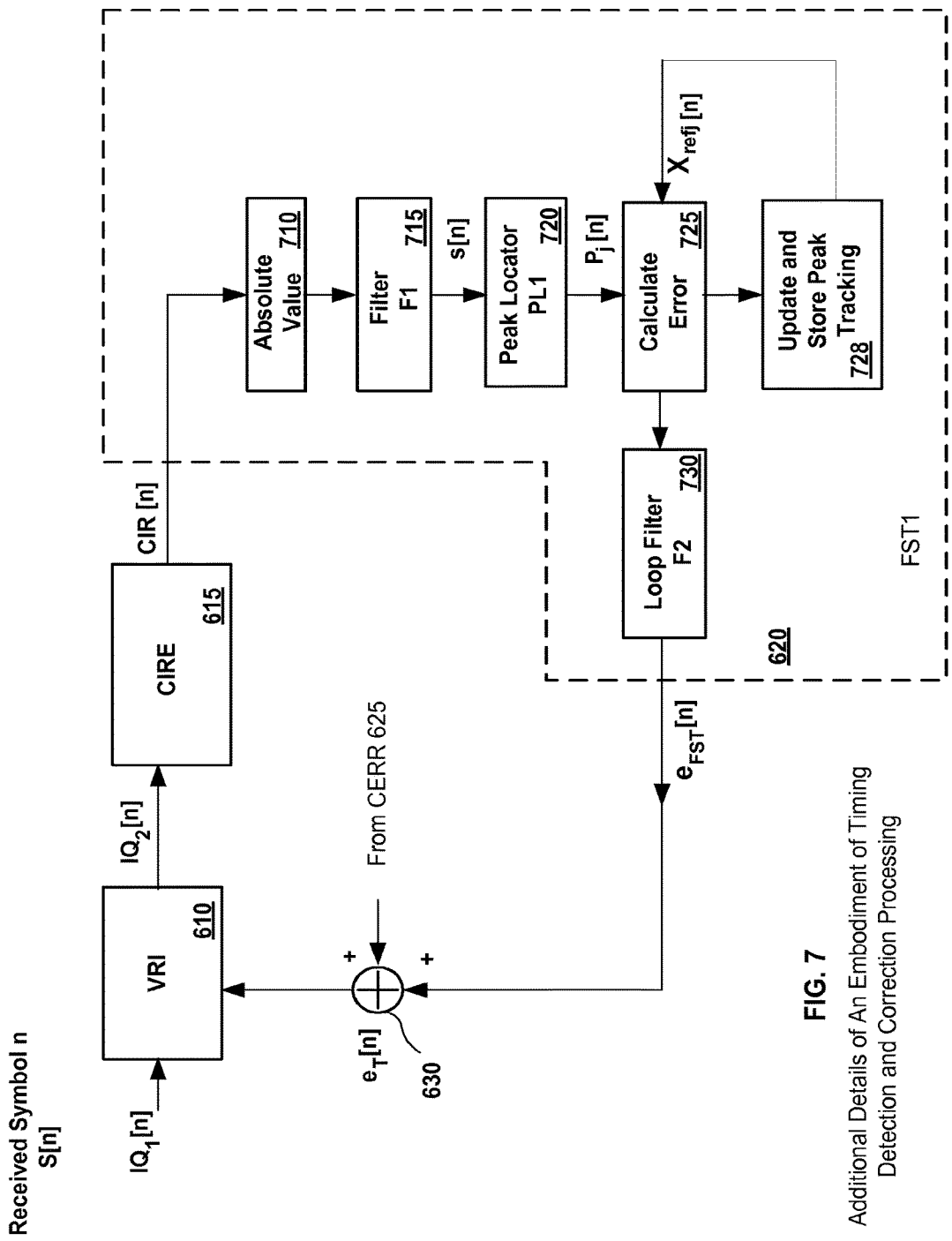
FIG. 7 illustrates additional details of an embodiment of timing detection and correction processing in accordance with aspects of the present invention.

Attention is now directed to FIG. 7, which illustrates one embodiment of FST module 620. At a high level, FST Module 620 is configured to receive a channel impulse response estimate and then generate an FFT timing adjustment parameter, in the form of an error signal for adjusting the FFT timing in conjunction with VRI 620, based at least in part on the channel impulse response estimate. In alternate embodiments (not shown), FST module 620 may be configured to generate the FFT timing adjustment parameter as an FFT trigger signal or other FFT control signal, based on the processing described herein with respect to FST 620, rather than providing an error signal to adjust VRI 620.

As shown in FIG. 7, in an exemplary embodiment, the channel impulse response estimator output CIR[n] may first be provided to an absolute value module 710, which is configured to generate a signal corresponding to the absolute value of CIR[n] representing the magnitude of the channel impulse response estimate. The absolute value of the channel impulse response CIR[n] may then filtered by Filter module F1 715, which is typically a lowpass filter, and the resulting filtered signal s[n] is sent to peak locator module PL1 720, which generates peak value locations $P_j[n]$ associated with the channel response estimate.

Figure 8A:
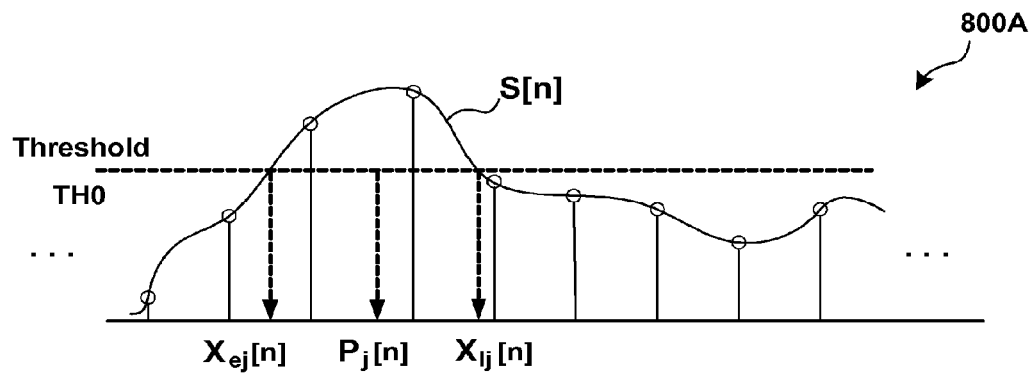
FIG. 8A illustrates an example signal and associated processing signal parameters for peak determination in accordance with aspects of the present invention.
Figure 8B:
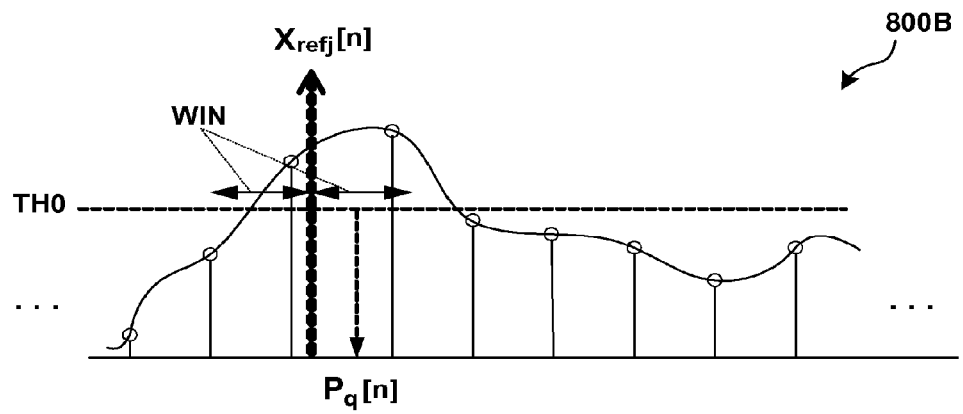
FIG. 8B illustrates an example signal and associated processing signal parameters for peak detection and tracking in accordance with aspects of the present invention.
Figure 8C:
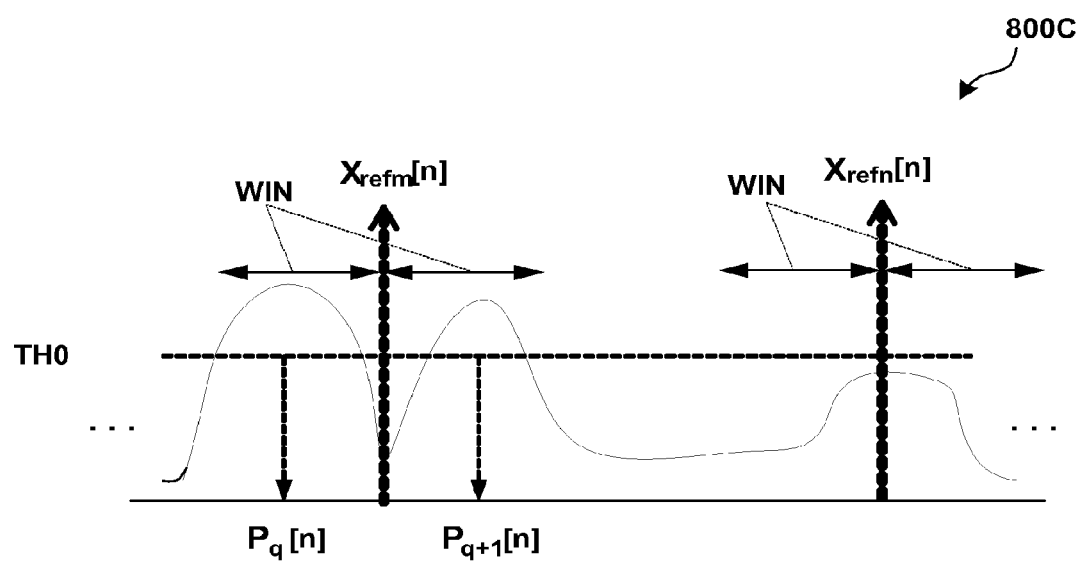
FIG. 8C illustrates an example signal having multiple peaks, and associated processing signal parameters for peak detection and tracking in accordance with aspects of the present invention.

Example signals that may be generated by FST 620 are illustrated in FIGS. 8A-8C, with relevant signal parameters shown. Error determination module 725 generates an error signal to facilitate adjustment of FFT timing (as noted previously, this may also be a trigger signal or other signaling mechanism to control FFT timing in alternate embodiments). A peak update and tracking module 728 may be coupled to the error determination module 725. Peak update modulate 728 is configured to receive and store initial values of the estimated peaks (as detected during an initial processing cycle an/or on a later re-calibration cycle) as peak reference values (denoted herein as Xref values), as well as receive and store updates of the peak reference values. These values may then be provided to the error calculation module 725 for subsequent peak location tracking.

Further addressing the error calculation process, in one embodiment, error signal generation as may be performed in error determination module 725 is further described below in conjunction with FIG. 9.

Figure 9:
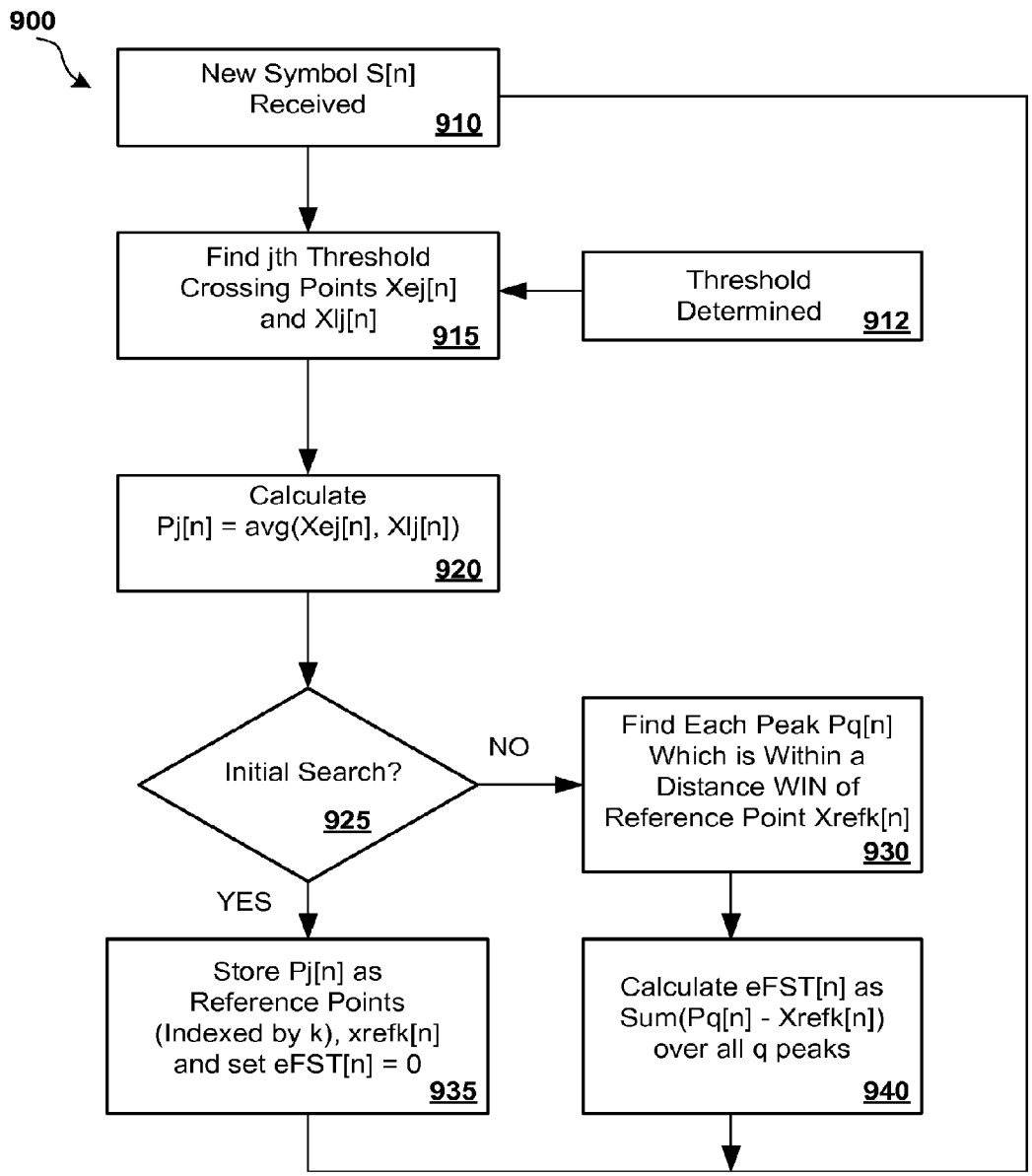
FIG. 9 illustrates an embodiment of a process for fine timing determination in accordance with aspects of the present invention.

FIG. 9 illustrates an embodiment of a process 900 associated with peak position error determination and tracking as may be performed in modules 725 and 728. In summary, at the start of a received symbol the process determines an estimation of the location of one or more peaks above a threshold value in the channel impulse response estimate, and stores the location of the peaks as peak reference values. Then during processing of subsequent received symbols, the peak location values are tracked and an error signal generated based on changes in the position of the peaks relative to the peak reference values.

More specifically, process 900 may begin at stage 910 when a new symbol S[n] is received. At stage 912 a threshold value, TH0, is set. This value may be based on parameters such as received signal strength as may be provided by a received signal strength indicator (RSSI) (not shown) or other signal strength detection apparatus included in receiver module 232, and/or based on other parameters such as noise level, distortion floor or other signal and/or noise parameters that are likewise provided by corresponding modules (not shown). The threshold value TH0 may be continuously monitored and updated in some embodiments (such as upon receipt of each new symbol) or may be set for a give time interval and then periodically or asynchronously updated.

Once the threshold value TH0 is set for a particular received symbol or symbols, crossings of the channel impulse response estimate above and below the threshold are determined, and location estimates of peaks associated with corresponding pairs of threshold crossings are then determined at stage 915. An example of aspects of this process is shown in further detail in FIG. 8A, with the positive slope threshold crossing denoted as sub-e (i.e. the jth positive slope threshold position Xej) and the negative slope threshold denoted as sub-1 (i.e., Xlj).

For each pair Xej and Xlj, an estimate of the location of the corresponding peak, Pj[n] (representing the jth peak value of the nth symbol), is determined. This may be done by, for example, averaging the position values of the associated threshold crossings Xej and Xlj to determine the estimated peak location. Other methods may also be used, such as by performing a weighted average of samples between Xej and Xlj, or by other methods.

Once all of the peak locations are determined for a particular symbol, S[n] (i.e., the j peak values for symbol n) an error signal may be generated based on a function of the determined peak locations. In typical embodiments this will comprise a two-step search process, with an initial search performed at the start of the detection process to set reference values based on the initial peak locations, such as during receipt of a test or first symbol) with updated searches and associated tracking and adjustment performed on successive symbols.

This two-step process may be done as shown in process 900 by performing a test for the initial search at stage 925. If the search in an initial search, the j peak location values (i.e., Pj[0]s) determined initially may be stored as peak reference values Xrefq[n] (with change in index from j to q, where q equals the number of initial peaks determined) at stage 935 for use in subsequent iterations, and the initial error signal eFST[n] initialized to a reference value which may be set to a value based on the initial Xref[n] values or set to a zero or other initialization value. The Xref values may be updated and stored by module 728 as shown in FIG. 7.

Upon receipt of a subsequent symbol, the process stages 910, 912, 915 and 920 and 925 may be repeated to update the peak location estimates for the subsequent symbol. At stage 925, execution may continue to stage 930 where changes in peak locations may be detected and updating of the peak reference values may be performed. Details of this aspect of process 900 are shown in FIG. 8B with reference to a symbol received subsequent to the symbol shown in FIG. 8A. Specifically, on the second and subsequent iteration(s) of process 900 at stage 930, updated peak locations within a search range "WIN" of the initial peak reference locations are identified (As noted below, on each iteration the reference location values may change, and therefore the search range WIN may be updated if the reference location values change). The value of WIN may be adjusted dynamically in some embodiments based on signal or channel characteristics, however, in an exemplary embodiment the value of WIN is a pre-determined fixed value. For each of the determined peak values that fall within the range WIN, an offset distance value is determined. For example, as shown in FIG. 8B, the offset value may be determined as the difference between the reference value (Xrefj[n−1]) and an associated peak value Pj[n]. FIG. 8C illustrates a corresponding example where there are two peaks in the response, and two corresponding reference values.

Once the offset is determined for all of the peaks with the range WIN of the references, a timing error adjustment signal eFST[n] may be generated. This signal may be based on a function of the differences between the peak values and the references, such as by taking the sum of the differences between the references and peak values (i.e., eFST=sum (Xrefk[n−1]−Pq[n]) over all q (where q=number of determined peaks within the range WIN). Alternately, other metrics may be used. For example, in some embodiments a non-linear metric, such as the cube of the differences may be used.

Once the timing error adjustment signal eFST[n] is determined, it may be sent to a filter (e.g., accumulator) such as loop filter F2 as shown in FIG. 7. As further shown in FIG. 7 and described previously herein, the filtered error signal may be combined with any error signals generated by CERR 625 or other error signal generators (not shown) to be provided to VRI, where it may be used to advance or retard the sample timing and correspondingly the FFT timing.

As noted previously, in an exemplary embodiment, FFT window placement is done after the resampling process performed in VRI 610. The FFT processing is typically done by counting the number of received samples. For example, suppose the CP and OFDM symbol length are M and N, respectively, and the FFT window starts right after the CP. FFT window placement may be done by counting the number of input samples, which places the FFT window from M+1 to M+N samples every time it receives M+N samples. This is not changed even if VRI 610 changes sampling rate. However, if VRI 610 increases the sampling frequency, the FFT window will advance in time, and if VRI 610 decreases the sampling frequency, the FFT window will be retarded in time. Thus, changing the sampling frequency in VRI provides an efficient method for adjusting the FFT window timing.

New peaks may appear or disappear in the channel impulse response. This may be accommodated by a variety of approaches, including adjusting the reference location whenever there is no peak detected within +/− WIN around the reference locations. In this case, the initialization process may be repeated and subsequently followed by the tracking process described herein. Alternately, if there is at least one peak within +/− WIN around any reference location, the references need not be updated.

Figure 10:
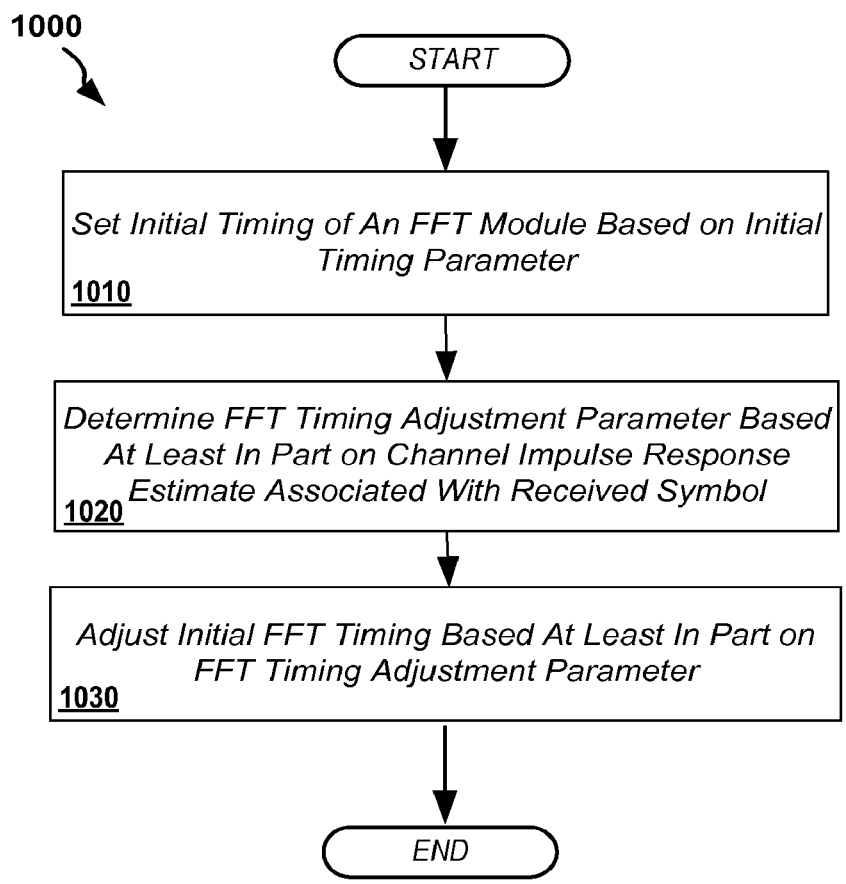
FIG. 10 illustrates an embodiment of a process for controlling FFT module timing, such as in a communication receiver.

FIG. 10 illustrates details of a process 1000 that may be used to, for example, control FFT module timing, such as in an OFDM receiver or receiving apparatus. At stage 1010, an initial timing of the FFT module based may be set, which may be based on, for example, an initial FFT timing parameter. At stage 1020, a stage of determining, based at least in part on a channel impulse response estimate associated with a first received symbol, an FFT timing adjustment parameter may be performed. At stage 1030, the initial FFT timing may be adjusted based at least in part on the FFT timing adjustment parameter, so as to provide an adjusted FFT timing.

The initial FFT timing may be adjusted in process 1000 by, for example, providing a resampled FFT input signal based on the received signal. The sample rate of the resampled signal may be set based at least in part on the FFT timing adjustment parameter. The FFT timing adjustment parameter may be an error signal. A variable rate interpolator may be configured to generate the resampled FFT signal at a sample rate that may be based at least in part on the FFT timing adjustment parameter. The FFT timing adjustment parameter may be an error signal.

The stage 1020 of determining an FFT timing adjustment parameter may include, for example, one or more of the steps of receiving the channel impulse response estimate, determining one or more peaks in the channel impulse response estimate, comparing the one or more peaks to a set of one or more reference values, and generating the FFT timing adjustment parameter based at least in part on said comparing.

The one or more reference values may be generated by a process that may include, for example, one or more stages of setting a threshold value, determining one or more pairs of threshold crossing points, generating the one or more peaks based on the one or more pairs of threshold crossing points, and storing the one or more peaks as the reference values. The stage of determining one or more peaks may include one or more of the stages of receiving the channel impulse response estimate, determining one or more sets of threshold crossing points, and generating the one or more peaks based on the one or more sets of threshold crossing points. The ones of said one or more peaks may be generated as the average of corresponding ones of the threshold crossing points of the one or more sets of threshold crossing points. A stage of generating the FFT timing adjustment parameter based at least in part on said comparing may include one or both of the stages of determining a subset of peaks within said one or more peaks, said subset consisting of peaks within a distance WIN of ones of the reference points, and generating the FFT timing adjustment parameter as a function of the differences between ones of the subset of peaks and corresponding ones of the reference points. The process 1000 may further include generating an updated FFT timing adjustment responsive to receipt of a subsequent symbol at the receiver In another aspect, the disclosure relates to a communication apparatus configured to embody the process 1000. The communication apparatus may include, for example, a processor module configured to: perform one or more of the stages of setting an initial timing of an FFT module based on an initial FFT timing parameter; determine, based at least in part on a channel impulse response estimate associated with a first received symbol, an FFT timing adjustment parameter; and adjust the initial FFT timing based at least in part on the FFT timing adjustment parameter so as to provide an adjusted FFT timing.

In one embodiment, the communications apparatus may include, for example, one or more of a means to set an initial timing of an FFT module based on an initial FFT timing parameter, a means to determine, based at least in part on a channel impulse response estimate associated with a first received symbol, an FFT timing adjustment parameter, and a means to adjust the initial FFT timing based at least in part on the FFT timing adjustment parameter so as to provide an adjusted FFT timing.

Alternately, or in addition, process 1000 may be embodied in tangible medium, such as a computer program product. The computer program product may include a computer-readable medium having codes for causing a processor to implement or initiate implementation of, for example, one or more of the stages of process 1000, such as setting an initial timing of the FFT module based on an initial FFT timing parameter; determining, based at least in part on a channel impulse response estimate associated with a first received symbol, an FFT timing adjustment parameter; and adjusting the initial FFT timing based at least in part on the FFT timing adjustment parameter so as to provide an adjusted FFT timing.

The process 1000 may be embodied in, for example, an apparatus for controlling FFT timing in a receiver. The apparatus may include one or both of a signal characterization module disposed to generate a channel response estimate based on a first received symbol signal, and a timing control module disposed to generate an FFT timing adjustment parameter based at least in part on the channel response estimate. The signal characterization module may include one or both of an IFFT module coupled to the output of a demodulator FFT module, and a channel impulse response estimator module coupled to an output of the IFFT module. The channel impulse response estimator may be configured to generate the channel impulse response estimate based at least in part on the output of the IFFT module. The timing control module may include one or both of a variable rate interpolator, and a fine symbol timing module disposed to generate, based at least in part on the channel impulse response estimate, the FFT timing adjustment signal as an error signal. The error signal may be generated so as to adjust the sample rate of the variable rate interpolator responsive to the channel impulse response estimate.

The apparatus may further include, for example, an FFT module. The FFT module may be configured to receive an output of the variable rate interpolator, and generate an output signal approximating a transmitted symbol corresponding to the received symbol. The fine symbol timing module may include one or more of an absolute value module configured to generate an absolute value signal based on the channel impulse response estimate, a peak locator module configured to detect one or more peak values in the absolute value signal, and an error calculation module configured to generate the FFT timing adjustment signal.

The signal characterization module may further include, for example, a clock error module disposed to generate a clock error signal. The timing control module may include one or both of a combiner module and a variable rate interpolator module. The combiner module may be configured to combine the FFT timing adjustment signal and the clock error signal so as to generate, as an output, a combined error signal. The output may be coupled to an input of the variable rate interpolator.

Figure 11:
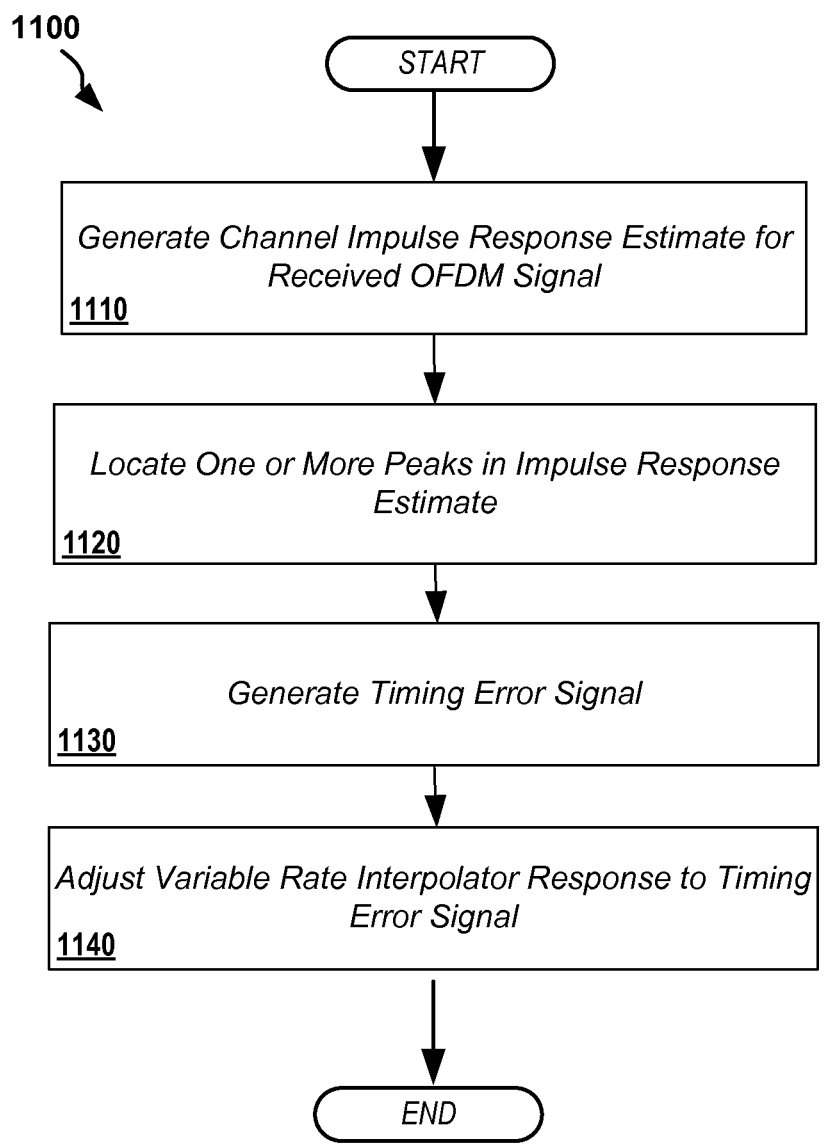
FIG. 11 illustrates an embodiment of a process for adjusting a variable rate interpolator, such as in a communication receiver.

FIG. 11 illustrates details of a process 1100 that may be used, for example, to adjust a variable rate interpolator, such as in a communication receiver such as an OFDM receiver. At stage 1110, a channel impulse response estimate for a received OFDM signal may be generated. At stage 1120, the location of one or more peak values in the channel impulse response estimate may then be detected or determined. At stage 1130, a timing error signal may be generated. The timing error signal may be based at least in part on the one or more peak values. At stage 1140, the variable rate interpolator may be adjusted in response to the timing error signal.

The stage 1120 of estimating the location of one or more peak values in the channel impulse response may include, for example, one or more of the stages of: selecting a threshold value; determining one or more pairs of threshold crossing locations of the channel impulse response estimate; and generating the location estimates of the one or more peak values based on ones of corresponding one or more pairs of threshold crossing locations. The ones of the location estimates of the one or more peak values may be generated as the average of ones of the corresponding threshold crossing locations.

The generating a timing error adjustment signal may include, for example, one or more of the stages of: comparing the one or more peaks to a set of one or more reference values; selecting ones of the estimates of the one or more peaks that are within a predefined search distance WIN of corresponding ones of the one or more reference values; and generating the timing error adjustment signal as a function of the difference between the selected ones of the one or more peak values and the corresponding ones of the one or more reference position values. The function of the difference between the selected ones of the one or more peak values and the corresponding one of the one or more reference position may be the sum of the differences. The generating the channel response estimate for the OFDM signal may be based on a pilot tone included in the OFDM signal.

The process 1100 may be embodied in, for example, a communication apparatus. The communication apparatus may include, for example, a processor module configured to implement or initiate implementation of one or more of the stages of: generating a channel impulse response estimate for a received OFDM signal; determining a location of one or more peak values in the channel impulse response estimate; generating a timing error signal based at least in part on the one or more peak values; and adjusting the variable rate interpolator responsive to the timing error signal.

The communication apparatus may include, for example, one or more of a means to: generate a channel impulse response estimate for a received OFDM signal; a means to determine a location of one or more peak values in the channel impulse response estimate, a means to generate a timing error signal based at least in part on the one or more peak values; and a means to adjust the variable rate interpolator responsive to the timing error signal.

The process 1100 may be embodied in, for example, a computer program product. The computer program product may include a computer-readable medium having codes for causing a processor to implement or initiate implementation, for example, one or more of the stages of: generating a channel impulse response estimate for a received OFDM signal; determining a location of one or more peak values in the channel impulse response estimate; generating a timing error signal based at least in part on the one or more peak values; and adjusting the variable rate interpolator responsive to the timing error signal.

The process 1100 may be embodied in, for example, an apparatus for adjusting a variable rate interpolator, such as in an OFDM receiver. The apparatus may include, for example, one or both of a channel impulse response estimator circuit disposed to generate a channel impulse response estimate for a received OFDM signal, and a fine symbol timing (FST) circuit disposed to generate an error signal to be used at least in part to adjust the variable rate interpolator, wherein the error signal is generated based on one or more peaks of the channel impulse response estimate. The channel impulse response estimator may include a circuit to generate the channel impulse response estimate based on a pilot tone provided in an OFDM signal received by the OFDM receiver. The FST circuit may include one or both of a peak locator circuit disposed to estimate the position of one or more peaks in the channel impulse response estimate, and an error determination circuit disposed to determine a position error between the estimate of the one or more peaks and one or more reference values. The apparatus may further include an updating circuit configured to update and store the peak reference values, and provide the updated peak reference values to the error determination circuit.

The peak locator circuit may be configured to estimate the location of the one or more peaks in the channel impulse response estimate by, for example, one or more of the stages of: selecting a threshold value; determining one or more pairs of threshold crossing locations of the channel impulse response estimate; and generating the peak location estimates of the one or more peak values based on corresponding one or more pairs of threshold crossing locations. The ones of the peak location estimates of the one or more peak values may be generated as the average of ones of the corresponding threshold crossing locations.

The error signal may be generated by one or more stages of, for example, comparing the one or more peaks to a set of one or more reference position values, selecting ones of the estimates of the one or more peaks that are within a search distance of corresponding ones of the one or more reference position values, and generating the error signal as a function of the difference between the selected ones of the one or more peak values and the one or more reference values. The function of the difference between the selected ones of the one or more peak values and the one or more reference values may be the sum of the differences.

The word "exemplary" is used herein to mean "serving as an example, instance, or illustration." Any aspect and/or embodiment described herein as "exemplary" is not necessarily to be construed as preferred or advantageous over other aspects and/or embodiments.

In some configurations, the apparatus for wireless communication may include means for performing various functions as described herein. In one aspect, the aforementioned means comprise a processor or processors and associated memory in which embodiments reside, and which are configured to perform the functions recited by the aforementioned means. In another aspect, the aforementioned means may be other programmable devices or other electronic or optical devices or other devices as are known or developed in the art. In another aspect, the aforementioned means may be a module or any apparatus configured to perform the functions recited by the aforementioned means, which may be in association with the processes described herein, such as those described with respect to FIGS. 10 and 11.

As noted, various aspects of the present invention relate to one or more processes such as are described and/or illustrated herein. These processes are typically implemented in one or more modules as are described herein, and such modules may include computer software stored on a computer readable medium including instructions configured to be executed by one or more processors and/or associated process steps or stages. Alternately or in addition, embodiments of the processes described herein may be embodied in hardware devices configured for implementing analog or digital logic such as programmable logic devices, ASICs, DSPs, FPGAs, microprocessors, gate arrays or other electronic devices.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. In some implementations, processors may be processors, such as communication processors, specifically designed for implementing functionality in communication devices or other mobile or portable devices.

The steps or stages of a method, process or algorithm described in connection with the embodiments disclosed herein may be embodied directly in hardware, in a software module executed by a processor, or in a combination of the two and/or other components. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

It is noted that, while the processes described and illustrated herein may include particular steps or stages, it is apparent that other processes including fewer, more, or different stages than those described and shown are also within the spirit and scope of the present invention. Accordingly, as noted previously, the processes and associated modules shown herein are provided for purposes of illustration, not limitation.

It is understood that the specific order or hierarchy of steps or stages in the processes and methods disclosed are examples of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Some embodiments of the present invention may include computer software and/or computer hardware/software combinations configured to implement one or more processes or functions associated with the present invention such as those described herein. These embodiments may be in the form of modules implementing functionality in software and/or hardware software combinations. Embodiments may also take the form of a computer storage product with a computer-readable medium having computer code thereon for performing various computer-implemented operations, such as operations related to functionality as describe herein. The media and computer code may be those specially designed and constructed for the purposes of the present invention, or they may be of the kind well known and available to those having skill in the computer software arts, or they may be a combination of both.

Examples of computer-readable media within the spirit and scope of the present invention include, but are not limited to: magnetic media such as hard disks; optical media such as CD-ROMs, DVDs and holographic devices; magneto-optical media; and hardware devices that are specially configured to store and execute program code, such as programmable microcontrollers, application-specific integrated circuits ("ASICs"), programmable logic devices ("PLDs") and ROM and RAM devices. Examples of computer code may include machine code, such as produced by a compiler or other machine code generation mechanisms, scripting programs, PostScript programs, and/or other code or files containing higher-level code that are executed by a computer using an interpreter or other code execution mechanism.

Computer code may be comprised of one or more modules executing a particular process or processes to provide useful results, and the modules may communicate with one another via means known or developed in the art. For example, some embodiments of the invention may be implemented using assembly language, Java, C, C#, C++, scripting languages, and/or other programming languages and software development tools as are known or developed in the art. Other embodiments of the invention may be implemented in hardwired circuitry in place of, or in combination with, machine-executable software instructions.

Those of skill will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications. They thereby enable others skilled in the art to best utilize the invention and various embodiments with various modifications as are suited to the particular use contemplated. It is intended that the following claims and their equivalents define the scope of the invention.

We claim:

1. A method for communication, the method comprising:
    in a demodulator of a receiver, said demodulator comprising a fast Fourier transform (FFT) module, timing control circuitry, and a combiner:
        sampling, by said FFT module, an input signal to generate a digital output signal of the demodulator;
        generating, by said timing control circuitry, a first error signal based on a first characteristic of an output of said FFT module;
        generating, by said timing control circuitry, a second error signal based on a second characteristic of said output of said FFT module, said output of said FFT being processed by an inverse fast Fourier transform module for said generating;
        selectively combining, by said combiner, said first error signal and said second error signal to generate a third error signal; and
        controlling, by a variable rate interpolator, a sampling timing of said FFT module using said third error signal.

2. The method of claim 1, wherein said first characteristic of said output of said FFT module is an offset between a clock of said receiver and a clock of a transmitter.

3. The method of claim 1, wherein said selectively combining is such that said third error signal is initially equal to said first error signal and then subsequently equal to a combination of said first error signal and said second error signal.

4. The method of claim 3, wherein said controlling of said FFT module using said third error signal is performed by said variable rate interpolator of said receiver, said variable rate interpolator receiving said third error signal from said combiner.

5. The method of claim 1, comprising generating, by said timing control circuitry, a channel impulse response estimate, wherein said second characteristic of said output of said FFT module is said channel impulse response estimate.

6. The method of claim 1, comprising generating, by said timing control circuitry, a channel impulse response estimate, wherein said second characteristic of said output of said FFT module is a location of a peak in said channel impulse response estimate.

7. The method of claim 1, wherein said generating said second error signal comprises comparing a peak of a channel impulse response estimate to one or more reference values.

8. The method of claim 7, comprising generating the reference values by:
    setting a threshold value;
    determining one or more pairs of threshold crossing points;
    determining the one or more reference values based on the one or more pairs of threshold crossing points; and
    storing the one or more reference values.

9. The method of claim 1, wherein the generating the second error signal comprises:
    determining a subset of peaks within one or more peaks of a channel impulse estimate, the subset consisting of peaks that are within a determined distance of at least one of a plurality of reference values; and
    calculating a differences between at least one of the peaks of the subset and at least one of the reference values.

10. A system comprising:
    a fast Fourier transform (FFT) module of a demodulator, said FFT module operable to sample an input signal to generate a digital output signal of said demodulator;
    a signal characterization module operable to:
        determine a first characteristic and a second characteristic of an output of said FFT module; and
        generate a first error signal based on said first characteristic of said output of said FFT module; and
    a control module operable to:
        generate a second error signal based on said second characteristic of said output of said FFT module, said output of said FFT being processed by an inverse fast Fourier transform module;
        selectively combine said first error signal and said second error signal to generate a third error signal; and
        control, by a variable rate interpolator, a sampling timing of said FFT module based on said third error signal.

11. The system of claim 10, wherein said first characteristic of said output of said FFT module is an offset between a clock of a receiver and a clock of a transmitter.

12. The system of claim 10, wherein said selective combination is such that said third error signal is initially equal to said first error signal and then subsequently equal to a combination of said first error signal and said second error signal.

13. The system of claim 10, wherein said variable rate interpolator is operable to control said FFT module using said third error signal received from a combiner.

14. The system of claim 10, wherein:
said signal characterization module is operable to generate a channel impulse response estimate; and
said second characteristic of said output of said FFT module is said channel impulse response estimate.

15. The system of claim 10, wherein:
said signal characterization module is operable to generate a channel impulse response estimate; and
said control module is operable to generate said second error signal based on a location of a peak of said channel impulse response estimate.

16. The system of claim 15, wherein said control module is operable to:
compare said peak of said channel impulse response estimate to one or more reference values; and
generate said second error signal based on a result of said comparison.

17. The system of claim 16, wherein said control module is operable to generate the reference values, wherein the generation comprises:
a setting of a threshold value;
a determination of one or more pairs of threshold crossing points;
a determination of the one or more reference vales based on the one or more pairs of threshold crossing points; and
a storing of the one or more reference values.

18. The system of claim 10, wherein the generation of the second error signal comprises:
determination of a subset of peaks within one or more peaks of a channel impulse estimate, the subset consisting of peaks that are within a determined distance of at least one of a plurality of reference values; and
calculation of a difference between at least one of the peaks of the subset and at least one of the reference values.

* * * * *